United States Patent
Li et al.

(10) Patent No.: US 11,516,674 B2
(45) Date of Patent: Nov. 29, 2022

(54) FRAMEWORK OF SECURE RANGING WITHOUT PHY PAYLOAD

(71) Applicant: Samsung Electronics Co., Ltd., Suwon-si (KR)

(72) Inventors: Zheda Li, Plano, TX (US); Aditya V. Padaki, Richardson, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 16/724,015

(22) Filed: Dec. 20, 2019

(65) Prior Publication Data

US 2020/0213842 A1  Jul. 2, 2020

Related U.S. Application Data

(60) Provisional application No. 62/868,467, filed on Jun. 28, 2019, provisional application No. 62/844,409, (Continued)

(51) Int. Cl.
*H04W 12/55* (2021.01)
*H04W 72/12* (2009.01)
*H04W 80/02* (2009.01)

(52) U.S. Cl.
CPC ....... *H04W 12/55* (2021.01); *H04W 72/1205* (2013.01); *H04W 80/02* (2013.01)

(58) Field of Classification Search
CPC . H04W 12/55; H04W 72/1205; H04W 80/02; H04W 12/03; H04L 43/106;
(Continued)

(56) References Cited

U.S. PATENT DOCUMENTS 6,091,959 A * 7/2000 Souissi .............. H04L 12/1845
                                                      455/457
9,510,312 B2  11/2016 Park et al.
(Continued)

FOREIGN PATENT DOCUMENTS

WO  2012/053857 A2  4/2012

OTHER PUBLICATIONS

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.
(Continued)

*Primary Examiner* — Dominic E Rego

(57) ABSTRACT

A method of a transmit apparatus in a wireless communication system supporting ranging capability is provided. The method comprises: determining at least one receive apparatus of a group of receive apparatuses participating in a ranging operation; identifying a scrambled timestamp sequence (STS) physical layer protocol data unit (PPDU) format 3 (SP3) ranging request reports information element (SRRR IE) for the at least one receive apparatus of the group of receive apparatuses; and transmitting, to the at least one receive apparatus of the group of receive apparatuses participating in the ranging operation, a ranging control message (RCM) including the SRRR IE using an in-band mechanism or an out-of-band mechanism, wherein the RCM including the SRRR IE is transmitted in a time-scheduled ranging operation.

20 Claims, 37 Drawing Sheets

Related U.S. Application Data filed on May 7, 2019, provisional application No. 62/829,364, filed on Apr. 4, 2019, provisional application No. 62/814,094, filed on Mar. 5, 2019, provisional application No. 62/787,590, filed on Jan. 2, 2019.

(58) Field of Classification Search
CPC .............. H04L 43/0864; G01S 13/765; G01S 13/0209; G01S 13/08
See application file for complete search history.

(56) References Cited

U.S. PATENT DOCUMENTS

| | | | | |
|---|---|---|---|---|
| 10,559,149 | B1* | 2/2020 | Kuechler | G07C 9/00309 |
| 2007/0160055 | A1* | 7/2007 | Takahashi | H04W 88/02 |
| | | | | 370/395.2 |
| 2009/0296661 | A1* | 12/2009 | Lee | H04W 52/283 |
| | | | | 370/335 |
| 2017/0086086 | A1 | 3/2017 | Bhatia et al. | |
| 2018/0279224 | A1* | 9/2018 | Yang | H04W 52/028 |
| 2019/0306825 | A1* | 10/2019 | Lindskog | H04L 27/2657 |

OTHER PUBLICATIONS

"IEEE Standard for Low-Rate Wireless Networks", IEEE Computer Society, IEEE Std 802.15.4TM, Dec. 2015, 708 pages.
Lee et al., "IEEE 802.15.4z MAC for Ranging", Dec. 18, 2018, 67 pages.
Leong et al., "MAC Considerations", Nov. 12, 2018, 4 pages.
Naguib et al., "MAC for Secure Ranging", Nov. 12, 2018, 14 pages.
Notification of Transmittal of the International Search Report and The Written Opinion of the International Searching Authority, or the Declaration dated Apr. 24, 2020 in connection with International Patent Application No. PCT/KR2019/018821, 9 pages.
European Patent Office, "Supplementary European Search Report" dated Dec. 23, 2021, in connection with European Patent Application No. 19907677.9, 8 pages.
Billy Verso (DecaWave), IEEE P802.15 Working Group for Wireless Personal Area Networks (WPANs) "Ranging procedures and messages" Nov. 2018, IEEE P802.15-18-xxxx-00-004z, 24 pages.

* cited by examiner

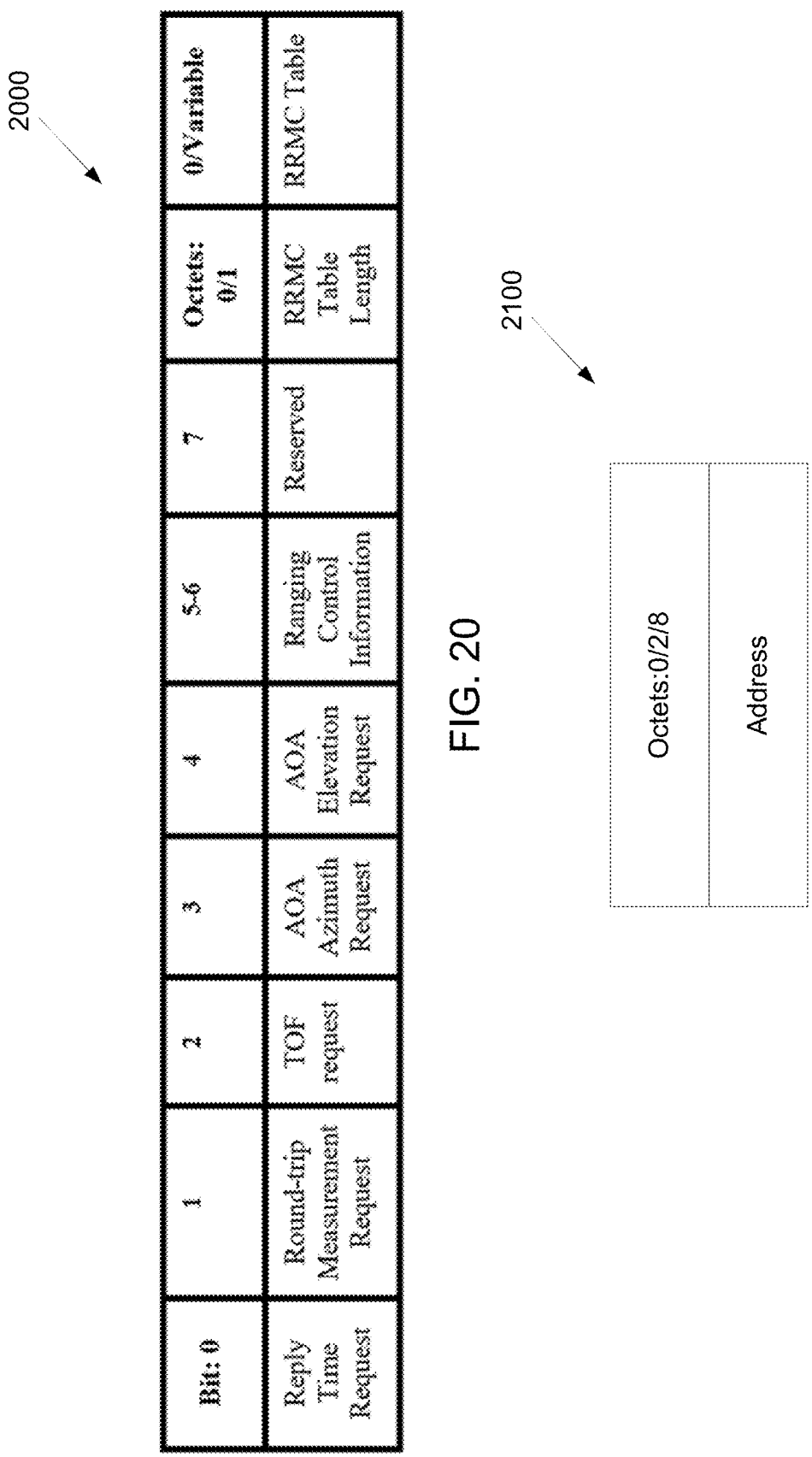

FIG. 26 — 2600

| Octets : 0/2/6/8 | Octets : 0/2/6/8 |
|---|---|
| Requestor Address | Provider Address |

FIG. 27 — 2700

| Bit: 0 | 1 | Octets : 0/2/6/8 | Octets : 0/2/6/8 |
|---|---|---|---|
| Requestor Address Present | Provider Address Present | Requestor Address | Provider Address |

FIG. 28 — 2800

| Bit: 0 | 1 | 2-7 | Octets : 0/2/6/8 | Octets : 0/2/6/8 |
|---|---|---|---|---|
| Requestor Address Present | Provider Address Present | Reserved | Requestor Address | Provider Address |

| Octets : 1 | Variable |
|---|---|
| NRRA Table Length | NRRA Table |

FIG. 29

| Bit: 0 | 1 | Octets : 1 | Variable |
|---|---|---|---|
| Requestor Address Present | Provider Address Present | NRRA Table Length | NRRA Table |

FIG. 30

| Octets : 0/2/6/8 | Octets : 0/2/6/8 |
|---|---|
| Requestor Address | Provider Address |

| Bit: 0 | 1 | Octets: 1 | Variable |
|---|---|---|---|
| Requestor Address Present | Provider Address Present | NRRRT Table Length | NRRRT Table |

| Octets: 0/2/6/8 | Octets: 0/2/6/8 |
|---|---|
| Requestor Address | Provider Address |

| Bit: 0 | 1 | Octets: 0/2/6/8 | Octets: 0/2/6/8 |
|---|---|---|---|
| Requestor Address Present | Provider Address Present | Requestor Address | Provider Address |

(3700)

3800

| Bit: 0 | 1 | 2~7 | Octets : 0/2/6/8 | Octets : 0/2/6/8 |
|---|---|---|---|---|
| Requestor Address Present | Provider Address Present | Reserved | Requestor Address | Provider Address |

| Octets : 1 | Variable |
|---|---|
| NRRRTM Table Length | NRRRTM Table |

| Bit: 0 | 1 | Octets : 1 | Variable |
|---|---|---|---|
| Requestor Address Present | Provider Address Present | NRRRTM Table Length | NRRRTM Table |

FIG. 40

| Bit: 0 | 1 | 2 | 3 | 4 | 5 | 6 | 7 | Octets : 0/2/8 | Octets : 0/2/8 |
|---|---|---|---|---|---|---|---|---|---|
| Requestor Address Present | Requestor Address Type | Provider Address Present | Provider Address Type | AOA Request | Reply Time Request | Round-trip Measure Request | Reserved | Requestor Address | Provider Address |

| Bit: 0 | 1 | 2 | 3 | 4 | 5-7 | Octets : 0/2/8 | Octets : 0/2/8 |
|---|---|---|---|---|---|---|---|
| Requestor Address Present | Provider Address Present | AOA Request | Reply Time Request | Round-trip Measure Request | Reserved | Requestor Address | Provider Address |

FRAMEWORK OF SECURE RANGING WITHOUT PHY PAYLOAD

CROSS-REFERENCE TO RELATED APPLICATIONS AND CLAIM OF PRIORITY

The present application claims priority to:
U.S. Provisional Patent Application No. 62/787,590 filed on Jan. 2, 2019;
U.S. Provisional Patent Application No. 62/814,094 filed on Mar. 5, 2019;
U.S. Provisional Patent Application No. 62/829,364 filed on Apr. 4, 2019;
U.S. Provisional Patent Application No. 62/844,409 filed on May 7, 2019; and
U.S. Provisional Patent Application No. 62/868,467 filed on Jun. 28, 2019.

The content of the above-identified patent documents is incorporated herein by reference.

TECHNICAL FIELD

The present disclosure relates generally to ranging operation in a wireless communication system. In particular, a secure ranging operation without physical payload in a wireless communication network is presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide a secure ranging operation without physical layer payload in a wireless communication network.

In one embodiment, a transmit apparatus in a wireless communication system supporting ranging capability is provided. The transmit apparatus comprises a processor configured to: determine at least one receive apparatus of a group of receive apparatuses participating in a ranging operation; and identify a scrambled timestamp sequence (STS) physical layer protocol data unit (PPDU) format 3 (SP3) ranging request reports information element (SRRR IE) for the at least one receive apparatus of the group of receive apparatuses. The transmit apparatus further comprises a transceiver operably connected to the processor, the transceiver configured to transmit, to the at least one receive apparatus of the group of receive apparatuses participating in the ranging operation, a ranging control message (RCM) including the SRRR IE using an in-band mechanism or an out-of-band mechanism, wherein the RCM including the SRRR IE is transmitted in a time-scheduled ranging operation.

In another embodiment, a receive apparatus in a wireless communication system supporting ranging capability is provided. The receive apparatus comprises a transceiver configured to receive, from at least one transmit apparatus of a group of transmit apparatuses participating in a ranging operation, a ranging control message (RCM) including a scrambled timestamp sequence (STS) physical layer protocol data unit (PPDU) format 3 (SP3) ranging request reports information element (SRRR IE) using an in-band mechanism or an out-of-band mechanism, wherein the RCM including the SRRR IE is transmitted in a time-scheduled ranging operation. The receive apparatus further comprises a processor operably connected to the transceiver, the processor configured to: determine at least one transmit apparatus of the group of transmit apparatuses participating in the ranging operation; and identify the SRRR IE for the at least one transmit apparatus of the group of transmit apparatuses.

In yet another embodiment, a method of a transmit apparatus in a wireless communication system supporting ranging capability is provided. The method comprises: determining at least one receive apparatus of a group of receive apparatuses participating in a ranging operation; identifying a scrambled timestamp sequence (STS) physical layer protocol data unit (PPDU) format 3 (SP3) ranging request reports information element (SRRR IE) for the at least one receive apparatus of the group of receive apparatuses; and transmitting, to the at least one receive apparatus of the group of receive apparatuses participating in the ranging operation, a ranging control message (RCM) including the SRRR IE using an in-band mechanism or an out-of-band mechanism, wherein the RCM including the SRRR IE is transmitted in a time-scheduled ranging operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 20 illustrates an example ranging request measurement and control IE content field format according to embodiments of the present disclosure;

FIG. 21 illustrates an example RRMC table row element format according to embodiments of the present disclosure;

FIG. 26 illustrates an example NHD ranging request angle-of-arrival IE content field format according to embodiments of the present disclosure;

FIG. 27 illustrates another example NHD ranging request angle-of-arrival IE content field according to embodiments of the present disclosure;

FIG. 28 illustrates yet another example NHD ranging request angle-of-arrival IE content field according to embodiments of the present disclosure;

FIG. 29 illustrates an example NHD ranging request angle-of-arrival IE content field format to include one or more requests according to embodiments of the present disclosure;

FIG. 30 illustrates another example NHD ranging request angle-of-arrival IE content field format to include one or more requests according to embodiments of the present disclosure;

FIG. 31 illustrates an example NHD ranging request reply time IE content field format according to embodiments of the present disclosure;

FIG. 35 illustrates another example NHD ranging request reply time IE content field format to include one or more requests according to embodiments of the present disclosure;

FIG. 36 illustrates an example NHD ranging request round-trip Measurement IE content field format according to embodiments of the present disclosure;

FIG. 37 illustrates an example NHD ranging request round-trip measurement IE according to embodiments of the present disclosure;

FIG. 38 illustrates an example NHD ranging request round-trip measurement IE content field according to embodiments of the present disclosure;

FIG. 39 illustrates an example NHD ranging request round-trip measurement IE content field format to include one or more requests according to embodiments of the present disclosure;

FIG. 40 illustrates another example NHD ranging request round-trip measurement IE content field format to include one or more requests according to embodiments of the present disclosure;

FIG. 45 illustrates an example NHD ranging request report IE content field according to embodiments of the present disclosure;

FIG. 46 illustrates an example NHD ranging request report IE content field according to embodiments of the present disclosure;

DETAILED DESCRIPTION

Figure 1:
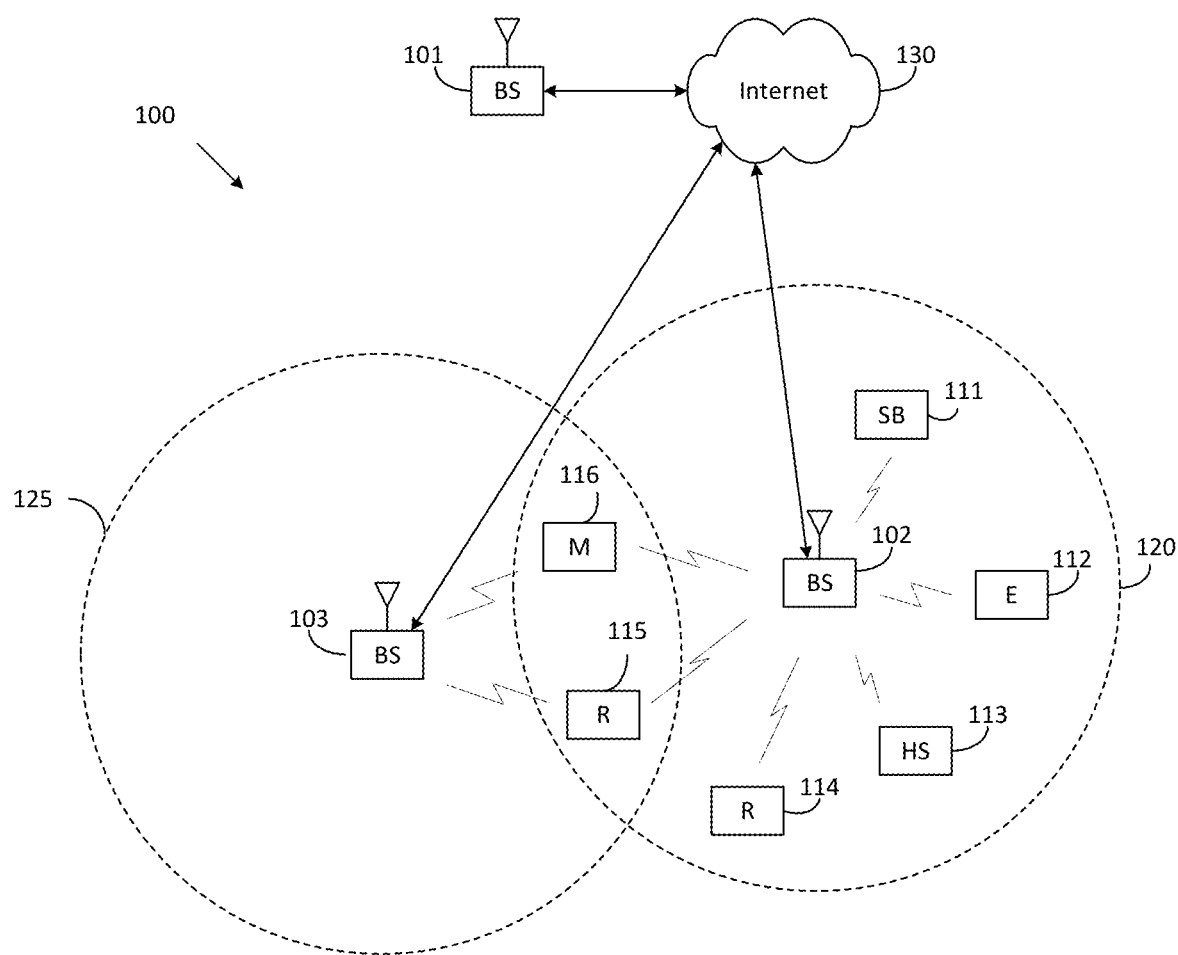
FIG. 1 illustrates an example wireless network according to embodiments of the present disclosure.
Figure 53:
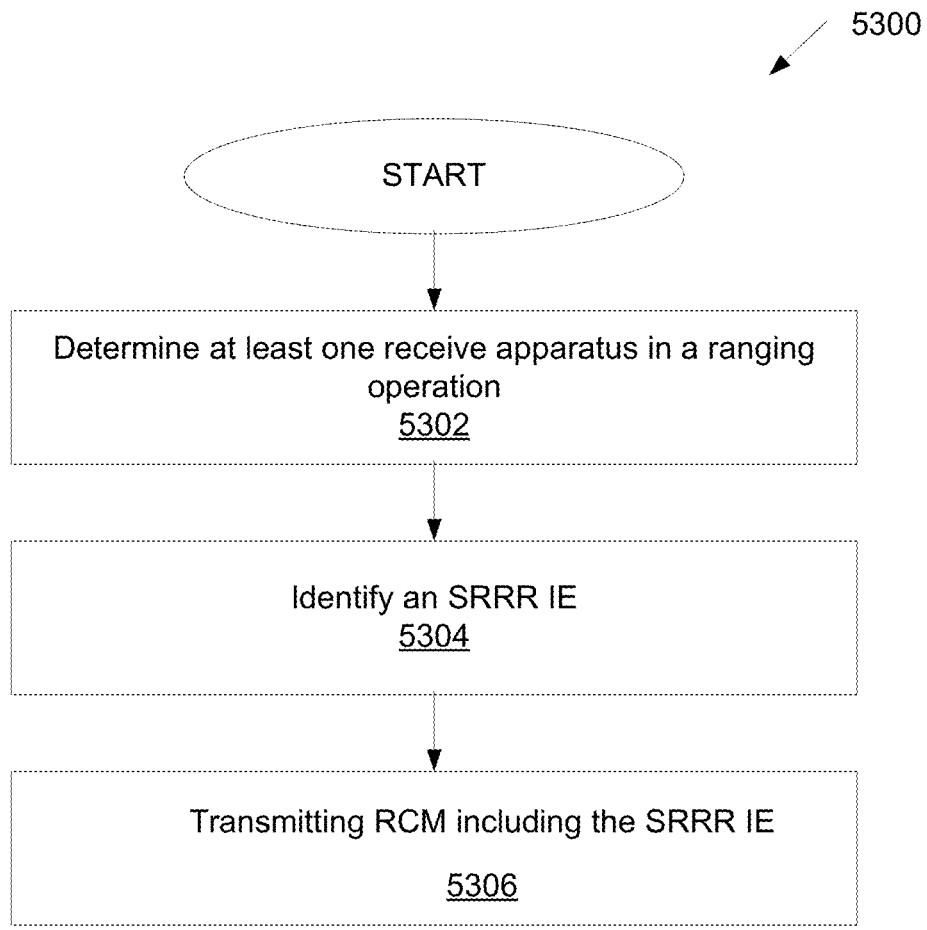
FIG. 53 illustrates a flowchart of a method for secure ranging operation according to embodiments of the present disclosure.

FIG. 1 through FIG. 53, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; and IEEE Standard Wireless Medium Access Control (MAC) and Physical Layer (PHY) Specifications for Low Rate Wireless Personal Area Networks (WPANs), IEEE Std 802.15.4, 2105.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 2:
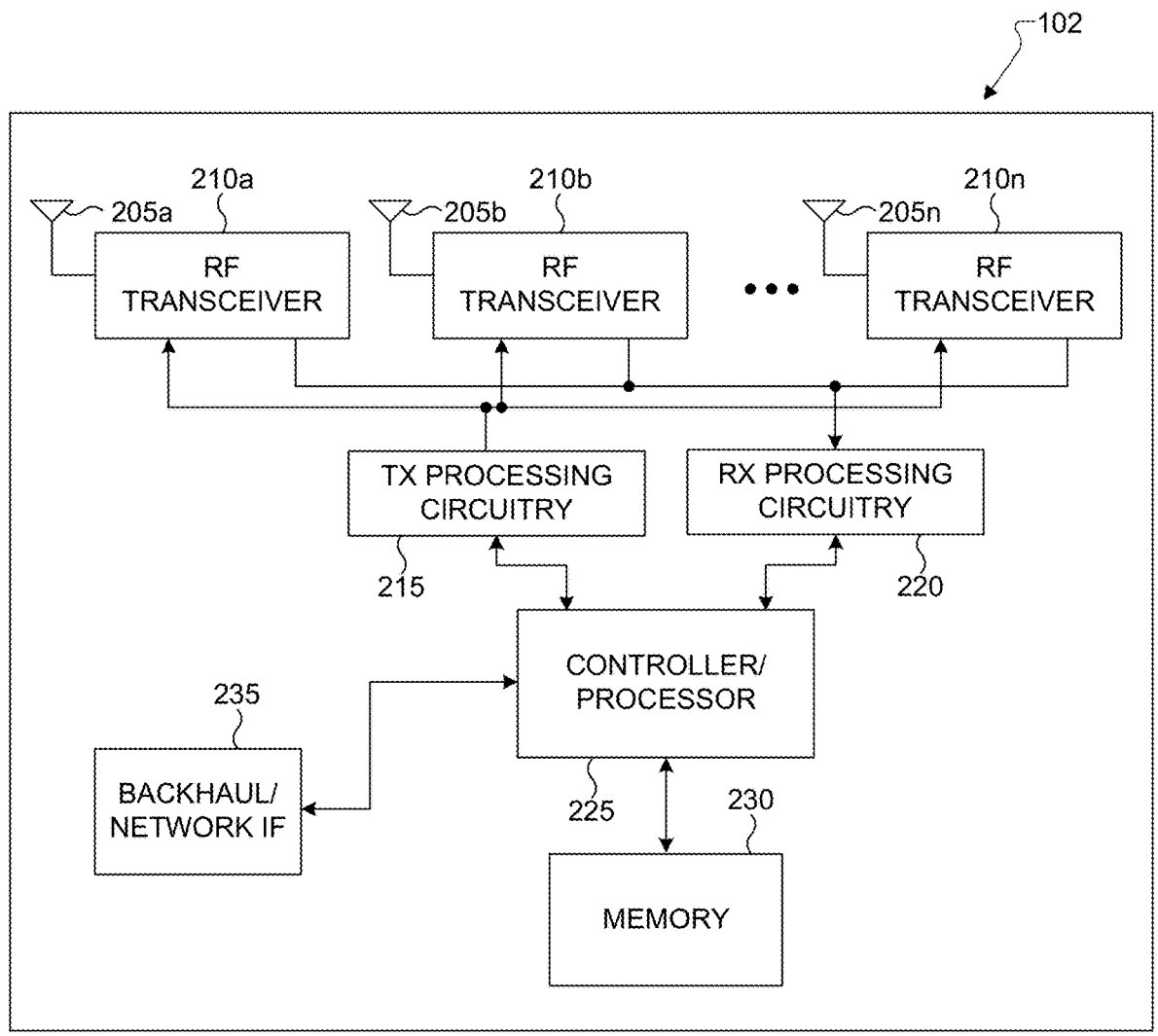
FIG. 2 illustrates an example gNB according to embodiments of the present disclosure.
Figure 3:
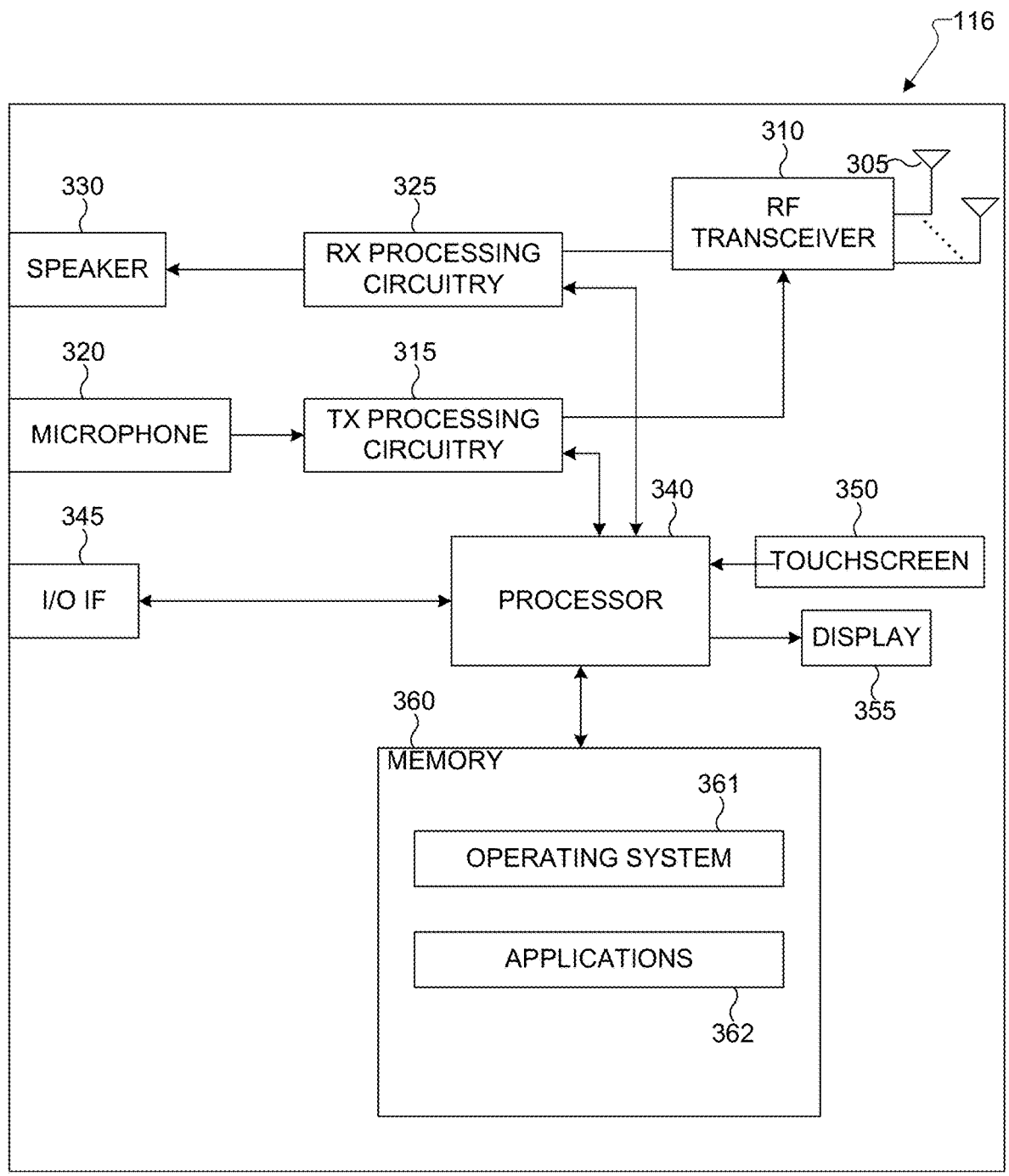
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for CSI reporting in an advanced wireless communication system. In certain embodiments, and one or more of the gNBs 101-103 includes circuitry, programming, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
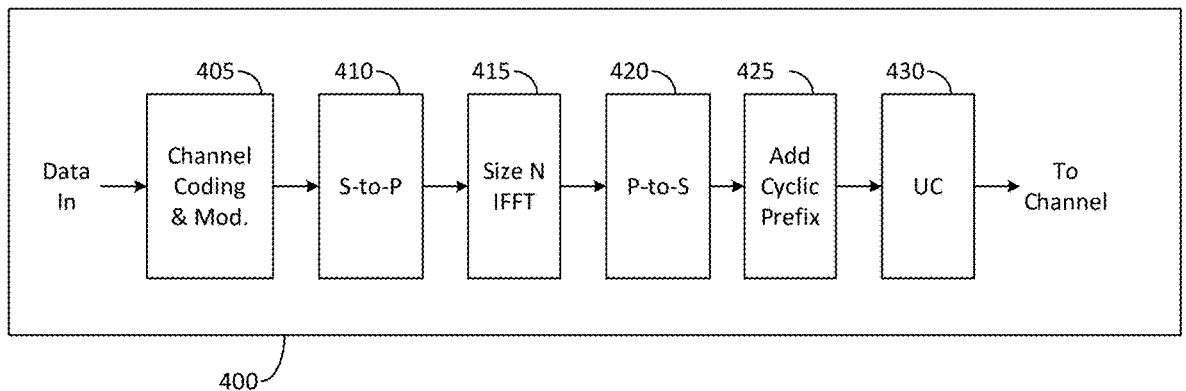
FIG. 4A illustrates a high-level diagram of an orthogonal frequency division multiple access transmit path according to embodiments of the present disclosure.
Figure 4B:
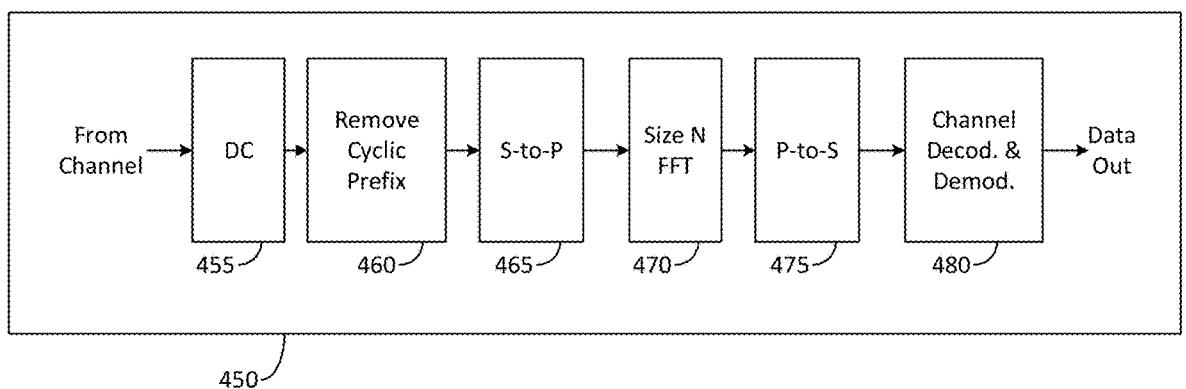
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
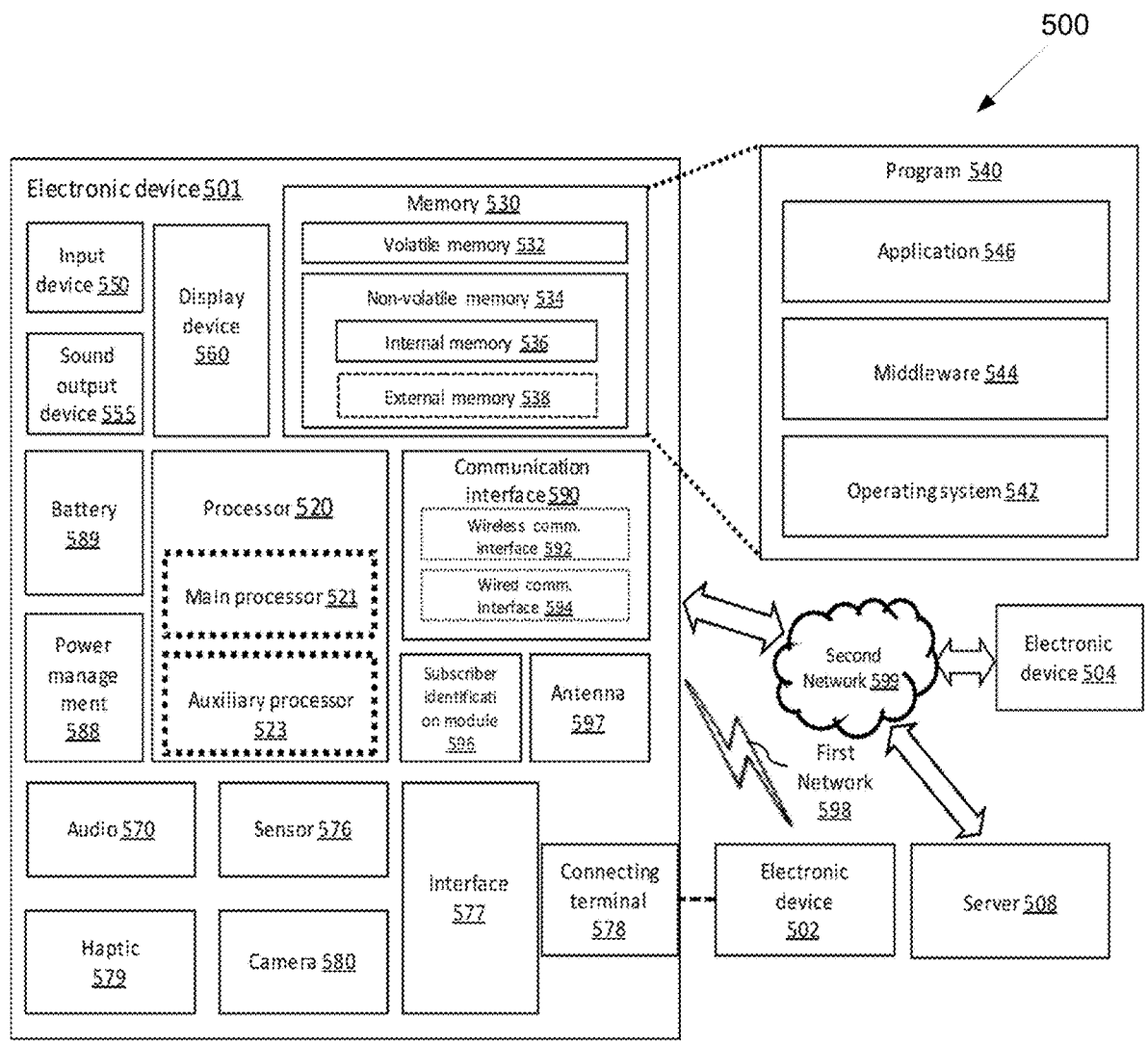
FIG. 5 illustrates an example electronic device according to embodiments of the present disclosure.

FIG. 5 illustrates an example electronic device 500 according to embodiments of the present disclosure. The embodiment of the electronic device 500 illustrated in FIG. 5 is for illustration only. FIG. 5 does not limit the scope of the present disclosure to any particular implementation.

PDs can be an electronic device. FIG. 5 illustrates an example electronic device 501 in a network environment 500 according to various embodiments. Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Ultra-wideband communication, realized by sending a short radio pulse, brings some key benefits to wireless communications, including low-complexity transceiver design, large capacity by utilizing large bandwidth, and robustness to inter-symbol-interference (ISI) of multi-path environment. Meanwhile, the extremely narrow pulses also lower the probability of interception and detection by the third party, which is promising for the data service with highly secure requirement, e.g., secure ranging. Currently, IEEE 802.15.4z is exploring and developing enhancements for capabilities of low rate and high rate UWB impulse radio, aiming to provide better integrity and efficiency.

Ranging and relative localization are essential for various location-based services and applications, e.g., Wi-Fi direct, internet-of-things (IoTs), etc. With the tremendous increasing of network devices, high demands of ranging requests can be foreseen in the near future, which implies overall ranging message exchanges occur frequently in the network. This may worsen the bottleneck limited by the battery capacity. Energy efficiency becomes more critical for mobile devices, and self-sustained static devices, e.g., low-power sensors.

Another critical issue in the dense environment is the latency to fulfill the scheduled ranging sessions for different ranging pairs. Based on the ranging procedures as defined in IEEE specification, each ranging pair may be assigned with dedicated time slots. It may result in long latency for latter scheduled pairs if there exist large amounts of ranging requests.

Figure 6:
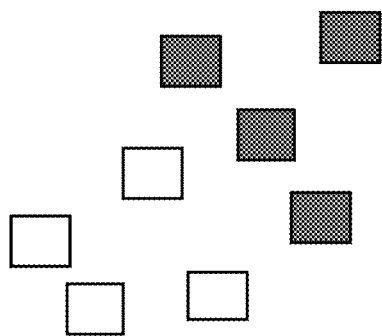
FIG. 6 illustrates an example many-to-many scenario according to embodiments of the present disclosure.

Therefore, implementation of more efficient ranging protocols is necessary to reduce the number of required message exchanges for many ranging pairs. In the present disclosure, the optimized ranging procedure is provided between a group of devices and another group of devices. As illustrated in FIG. 6, one or more devices of group-1 has the ranging request to one or more devices of group-2 or vice versa. Exploiting the broadcast characteristics of wireless channel, mechanisms of optimized transmissions can be respectively realized based on the ranging operation, i.e., single-sided two-way ranging (SS-TWR) and double-sided two-way ranging (DS-TWR), which significantly reduce the number of required information exchange, compared with the current standard.

FIG. 6 illustrates an example many-to-many scenario 600 according to embodiments of the present disclosure. The embodiment of the many-to-many scenario 600 illustrated in FIG. 6 is for illustration only. FIG. 6 does not limit the scope of the present disclosure to any particular implementation.

As illustrated in FIG. 6, group-1 and group 2 determined with one or more devices. One or more devices from group-1 have ranging requests to one or more devices from group-2.

In the present disclosure, for a pair of devices to fulfill message exchange of ranging, the devices and associated messages is provided by following respective terms: initiator; device which initializes and sends the first ranging frame (RFRAME) to one or more responders; responder, device which expects to receive the first RFRAME from one or more initiators; poll, RFRAME sent by initiator, and ranging response. RFRAME is sent by responder.

There are two aspects neglected in IEEE standard specification, which are essential for future use cases. The first one is the optimized transmission procedure between one or more initiators and one or more responders, which can be critical for energy-saving purpose. Since a poll can be broadcast to multiple responders, an initiator can initialize a multicast, i.e., one-to-many, ranging round by sending a single poll instead of launching multiple unicast ranging rounds. Similarly, since the ranging response can also be broadcast to multiple initiators, a responder can embed the requested data respectively from different initiator in a single ranging response message. Exploiting the broadcast characteristics of wireless channel, the optimized transmission procedure is promising for future UWB network.

The other neglected aspect is the option for the contention-based ranging in an UWB network. In IEEE specification, one ranging round just contains a single pair of devices, i.e., one initiator and one responder. Within one ranging round, transmissions are implicitly scheduled: a responder/initiator expects to receive the message from the far end and may start to transmit afterwards. Multiple ranging rounds can be scheduled by the CFP table of the sync frame. However, there can be other use cases that cannot be supported by IEEE standard specification. For example, the initiator broadcasts the poll, but it does not have the prior-knowledge of who may response. Similarly, the responder may not have the prior-knowledge of who may initialize the ranging, so it can wait and listen for a certain period of time to collect polls respectively from different initiators.

In the present disclosure, an UWB network is provided with ranging requests between a group of devices and another group of devices. As shown in FIG. 6, one or more devices of group-1 has the ranging request to one or more devices of group-2 or vice versa. To accommodate optimized ranging transmission procedure and other new use cases, the configuration of device role, i.e., whether the configuration of device is an initiator or a responder, and the scheduling information for scheduling-based ranging, need to be determined and exchanged before the ranging round starts. Aiming to build a stand-alone UWB network, the present disclosure defines new control IE, and ranging scheduling IE for initiators and responders, which can be exchanged over the UWB MAC. However, the present disclosure does not preclude other methods to exchange information via the higher layer or out-of-band management.

Figure 7:
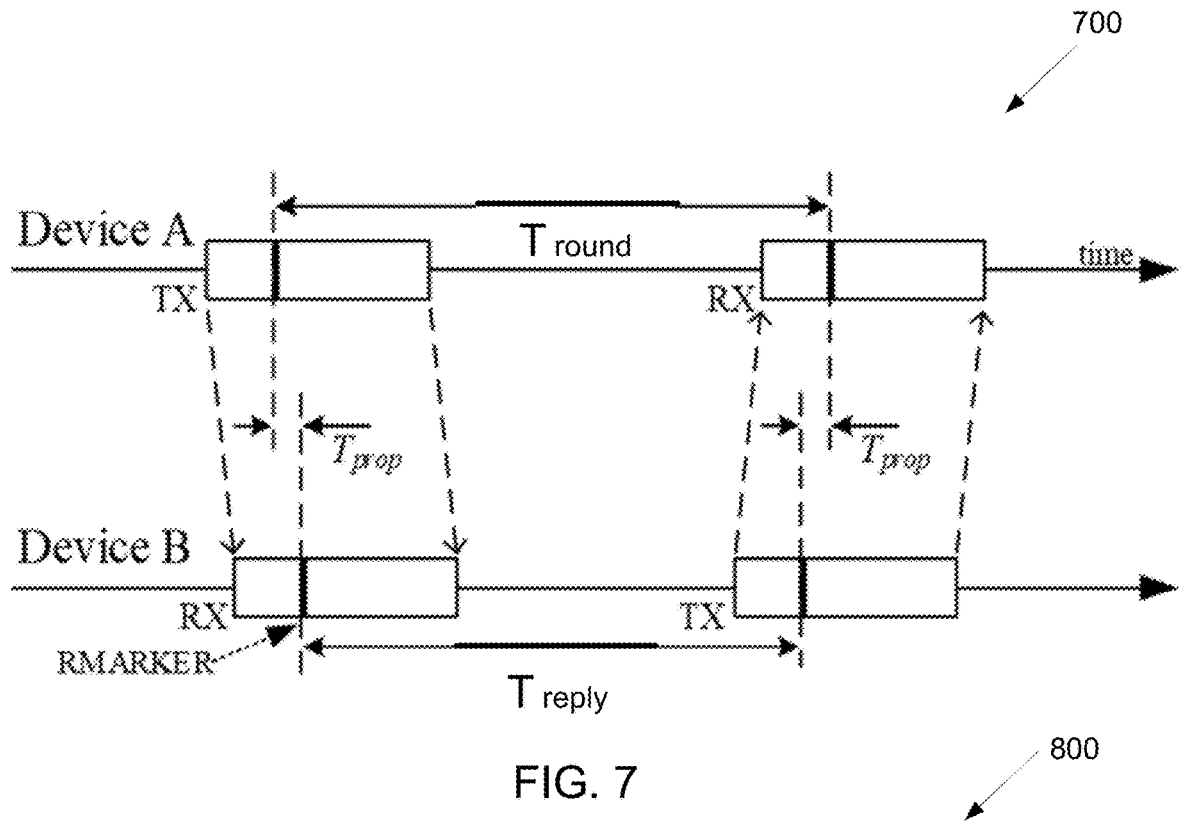
FIG. 7 illustrates an example single-sided two-way ranging according to embodiments of the present disclosure.

FIG. 7 illustrates an example single-sided two-way ranging 700 according to embodiments of the present disclosure. The embodiment of the single-sided two-way ranging 700 illustrated in FIG. 7 is for illustration only. FIG. 7 does not limit the scope of the present disclosure to any particular implementation.

SS-TWR involves a simple measurement of the roundtrip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation: $\hat{T}_{prop} = \frac{1}{2}(T_{round} - T_{reply})$.

Figure 8:
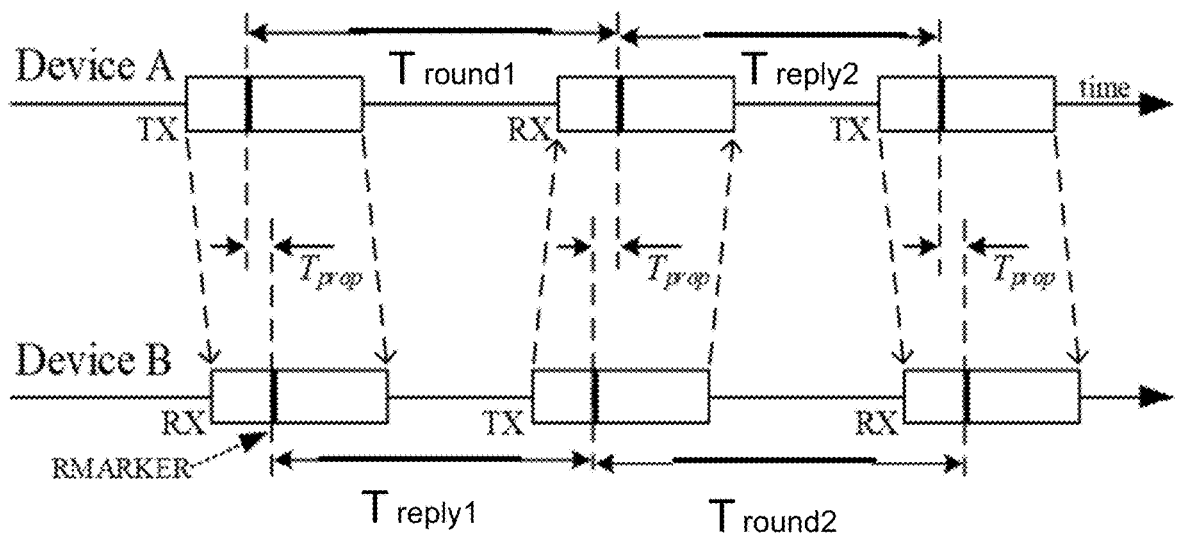
FIG. 8 illustrates an example double-sided two-way ranging with three messages according to embodiments of the present disclosure.

FIG. 8 illustrates an example double-sided two-way ranging with three messages 800 according to embodiments of the present disclosure. The embodiment of the double-sided two-way ranging with three messages 800 illustrated in FIG. 8 is for illustration only. FIG. 8 does not limit the scope of the present disclosure to any particular implementation.

DS-TWR with three messages is illustrated in FIG. 8, which reduces the estimation error induced by clock drift from long response delays. Device A is the initiator to initialize the first roundtrip measurement, while device B as the responder, responses to complete the first roundtrip measurement, and meanwhile initialize the second roundtrip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

Figure 9:
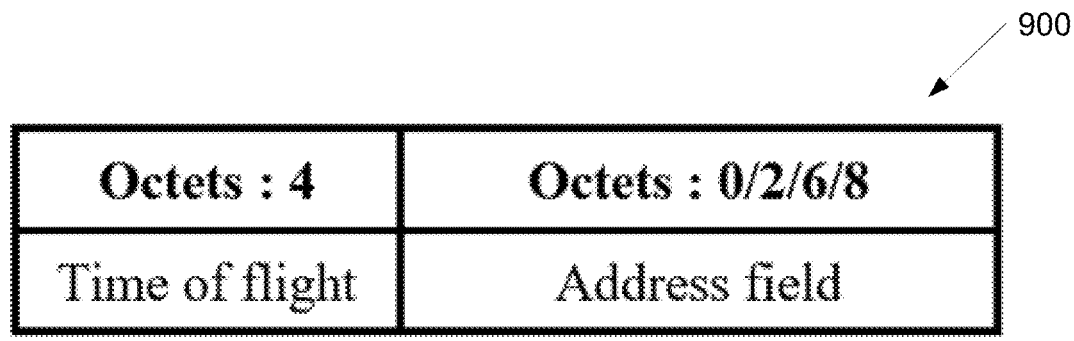
FIG. 9 illustrates an example ranging time-of-flight IE content field format according to embodiments of the present disclosure.

Ranging time-of-flight (RTOF) information element (IE) can be used to communicate the ranging result to the far end if requested. Since multiple ranging results between a device and others can be embedded into one data frame, a MAC address or other short addresses, e.g., a multicast group address can be added to this IE so that the device can extract the ranging result dedicated to it. If a single pair of devices participates in the ranging round, there is no need to use the address field. An example of RTOF IE content field format is shown in FIG. 9. Other examples are not precluded.

FIG. 9 illustrates an example ranging time-of-flight IE content field format 900 according to embodiments of the present disclosure. The embodiment of the ranging time-of-flight IE content field format 900 illustrated in FIG. 9 is for illustration only. FIG. 9 does not limit the scope of the present disclosure to any particular implementation.

Figure 10:
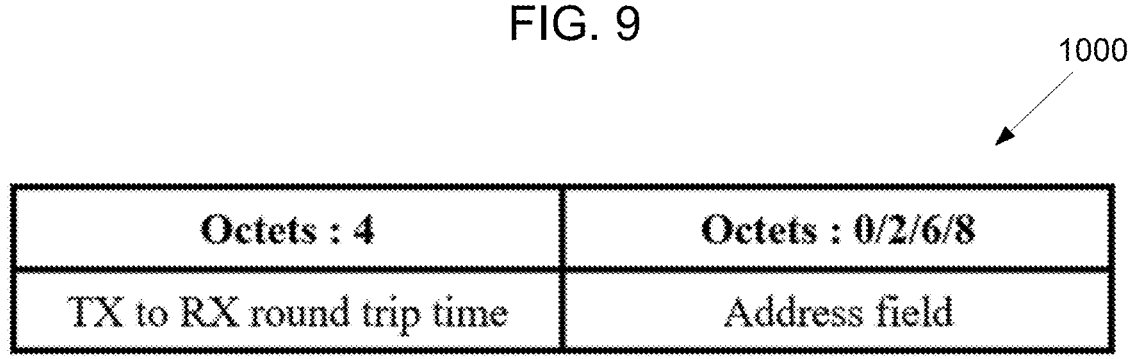
FIG. 10 illustrates an example ranging round trip measurement IE content field format according to embodiments of the present disclosure.

The ranging round trip measurement IE (RRTM IE) content includes the time difference between the transmit time of the ranging frame (RFRAME) initiating a round trip measurement and the receive time of the response RFRAME per source address that completes a round trip. The address field can be a 16-bit short address, a 48-bit MAC address, or a 64-bit extended address. If a single pair of devices participates in the ranging round, there is no need to use the address field. An example RRTM IE content field format is shown in FIG. 10. Other examples are not precluded.

FIG. 10 illustrates an example ranging round trip measurement IE content field format 1000 according to embodiments of the present disclosure. The embodiment of the ranging round trip measurement IE content field format 1000 illustrated in FIG. 10 is for illustration only. FIG. 10 does not limit the scope of the present disclosure to any particular implementation.

Figure 11:
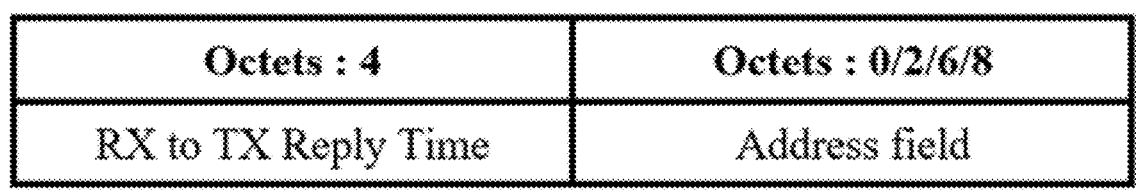
FIG. 11 illustrates an example ranging reply time instantaneous IE content field format according to embodiments of the present disclosure.

The RRTI IE content includes the time difference between the receive time of most recently received RFRAME per source address and the transmit time of the RFRAME containing the IE. The address field can be a 16-bit short address, a 48-bit MAC address, or a 64-bit extended address. If a single pair of devices participates in the ranging round, there is no need to use the address field. An example RRTI IE content field format is shown in FIG. 11. Other examples are not precluded.

FIG. 11 illustrates an example ranging reply time instantaneous IE content field format 1100 according to embodiments of the present disclosure. The embodiment of the ranging reply time instantaneous IE content field format 1100 illustrated in FIG. 11 is for illustration only. FIG. 11 does not limit the scope of the present disclosure to any particular implementation.

Figure 12:
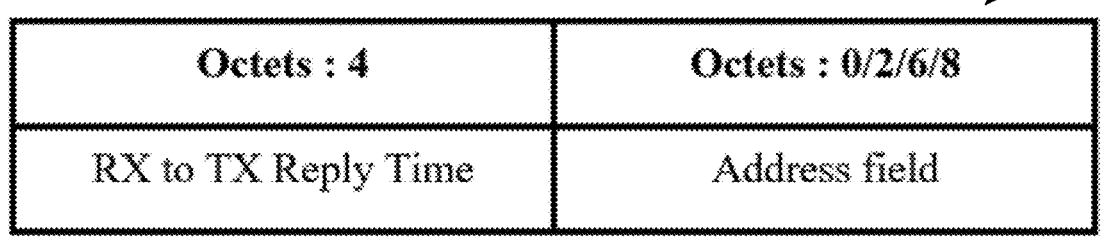
FIG. 12 illustrates an example ranging reply time deferred IE content field format according to embodiments of the present disclosure.

The ranging reply time deferred IE (RRTD IE) content includes the time difference between the receive time of most recently received RFRAME per source address and the transmit time of the responding RFRAME transmitted, sent most recently before the frame containing this IE. The address field can be a 16-bit short address, a 48-bit MAC address, or a 64-bit extended address. If a single pair of devices participates in the ranging round, there is no need to use the address field. An example RRTD IE content field format is shown in FIG. 12. Other examples are not precluded.

FIG. 12 illustrates an example ranging reply time deferred IE content field format 1200 according to embodiments of the present disclosure. The embodiment of the ranging reply time deferred IE content field format 1200 illustrated in FIG. 12 is for illustration only. FIG. 12 does not limit the scope of the present disclosure to any particular implementation.

The ranging angle-of-arrival (AoA) deferred (RAD) IE content includes the AoA estimation at the device receiving request of AoA. The RAD IE is employed as part of two-way ranging exchanges and used in the case where the device cannot determine the AoA until after the reply has been sent, and in this case the RAD IE carries the AoA in a subsequent frame. When the RAD IE is used in multicast/broadcast frame (e.g., multicast/broadcast/many-to-many ranging), the RAD IE content can include a MAC address or a device ID of source who requests the AoA estimation. The address field can be a 16-bit short address, a 48-bit MAC address, or a 64-bit extended address. Otherwise, the RAD IE has a zero-length content field. The content field of the RAD IE can be formatted as shown in FIG. 13.

Figure 13:
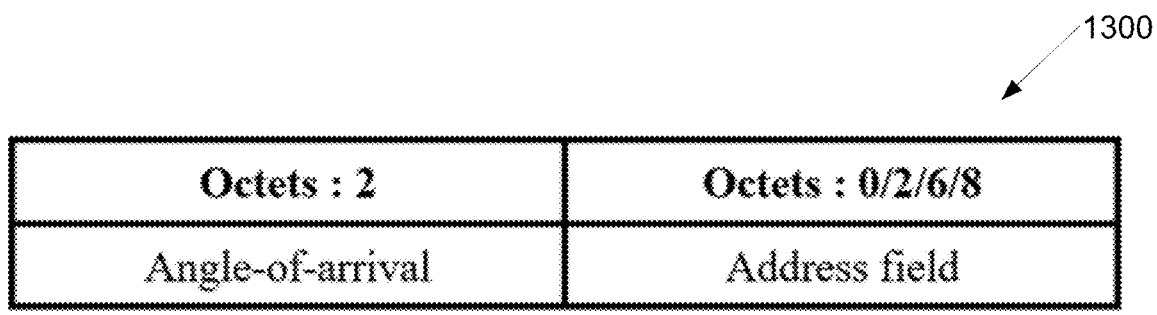
FIG. 13 illustrates an example ranging angle-of-arrival deferred IE content field format according to embodiments of the present disclosure.

FIG. 13 illustrates an example ranging angle-of-arrival deferred IE content field format 1300 according to embodiments of the present disclosure. The embodiment of the ranging angle-of-arrival deferred IE content field format 1300 illustrated in FIG. 13 is for illustration only. FIG. 13 does not limit the scope of the present disclosure to any particular implementation.

Figure 14:
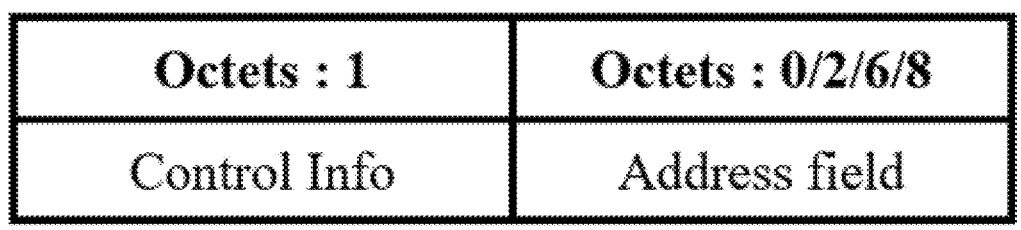
FIG. 14 illustrates an example ranging control single-sided TWR IE content field format according to embodiments of the present disclosure.

The ranging report control single-sided TWR (RRCST) IE is used to control SS-TWR message exchange. An example RCST IE content field format is shown in FIG. 14 and TABLE 1. Other examples are not precluded.

FIG. 14 illustrates an example ranging control single-sided TWR IE content field format 1400 according to embodiments of the present disclosure. The embodiment of the ranging control single-sided TWR IE content field format 1400 illustrated in FIG. 14 is for illustration only. FIG. 14 does not limit the scope of the present disclosure to any particular implementation.

TABLE 1

Values of the control info field in the ranging report control single-sided TWR IE

| Control Info value | Meaning |
| --- | --- |
| 0 | This frame indicates that the responding end does not require TX-to-RX round-trip time and ranging result |
| 1 | This frame indicates that the responding end requires TX-to-RX round-trip time at the end of exchange |
| 2 | This frame indicates that the responding end requires ranging result at the end of exchange |

Figure 15:
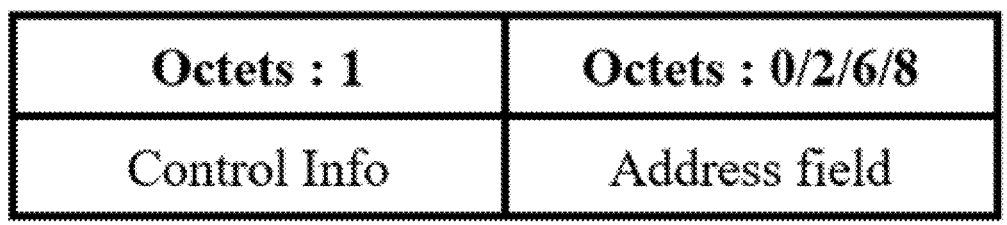
FIG. 15 illustrates an example ranging control double-sided TWR IE content field format according to embodiments of the present disclosure.

The ranging report control double-sided TWR (RRCDT) IE is used to control DS-TWR message exchange. An example RCDT IE content field format is shown in FIG. 15 and TABLE 2. Other examples are not precluded.

FIG. 15 illustrates an example ranging control double-sided TWR IE content field format 1500 according to embodiments of the present disclosure. The embodiment of the ranging control double-sided TWR IE content field format 1500 illustrated in FIG. 15 is for illustration only. FIG. 15 does not limit the scope of the present disclosure to any particular implementation.

TABLE 2

Values of the Control Info field in the Ranging Report Control Double-sided TWR IE

| Control Info value | Meaning |
| --- | --- |
| 0 | This frame is initiating DS-TWR and indicates that the initiating end does not require $1^{st}$ reply time, $2^{nd}$ TX-to-RX round-trip time or the ranging result |
| 1 | This frame is initiating DS-TWR and indicates that initiating end requires $1^{st}$ reply time and $2^{nd}$ TX-to-RX round-trip time at the end of exchange |
| 2 | This frame is initiating DS-TWR and indicates that initiating end requires ranging result at the end of exchange |
| 3 | This frame is continuing the DS-TWR, forming the request for the $2^{nd}$ TX-to-RX round-trip measurement |

A main enhancement for secure ranging is the inclusion a scrambled timestamp sequence (STS) in the basic PHY protocol data unit (PPDU) format. Since the unique STS of a device is known by one or more far ends in a trusted group, the secure ranging can be performed within the trusted group, and the chance of being attacked is significantly reduced. In the present disclosure, the framework is built upon the fact that STSs of devices have been exchanged successfully, which can be done via, e.g., higher layer control or out-of-band management. How to initialize/update STS and exchange the STS between devices is out of the scope of the present disclosure.

Figure 16:
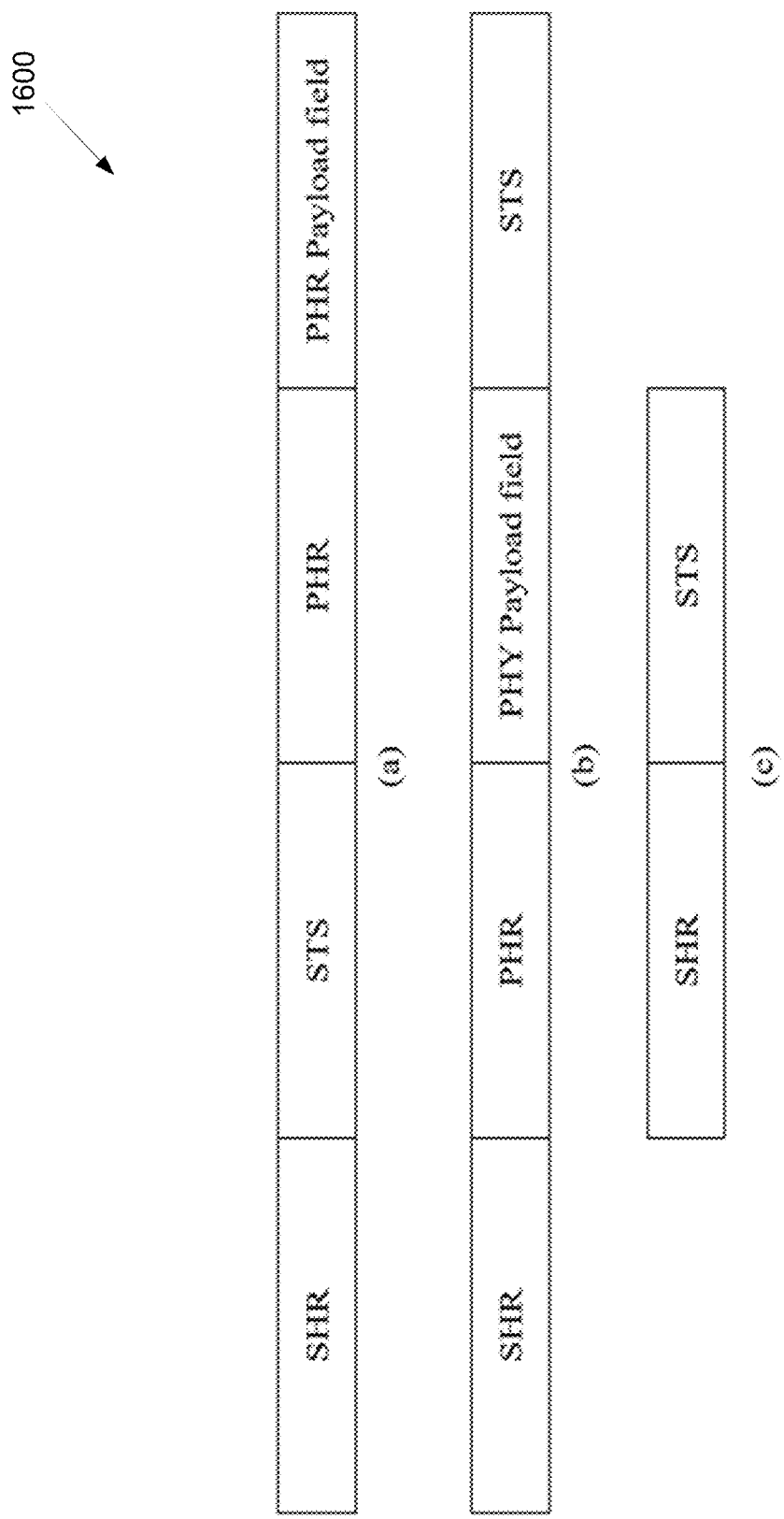
FIG. 16 illustrates an example three secure ranging PPDU Formats according to embodiments of the present disclosure.

Three secure ranging PPDU formats may be supported, the difference between the formats being the location of the STS and existence of a PHR and PHY payload field as FIG. 16. Abbreviations in FIG. 16 represent the following definitions, respectively: synchronization header (SHR); scrambled timestamp sequence (STS); and PHY header (PHY).

FIG. 16 illustrates an example three secure ranging PPDU formats 1600 according to embodiments of the present disclosure. The embodiment of the three secure ranging PPDU formats 1600 illustrated in FIG. 16 is for illustration only. FIG. 16 does not limit the scope of the present disclosure to any particular implementation.

The locations of STS are different in FIG. 16 (e.g., (a) and (b) in FIG. 16). For the format of FIG. 16 (e.g., (c) in FIG. 16), there is no PHY header or data field (NHD). It may can call the ranging based on PPDU format of FIG. 16 (e.g., (c) in FIG. 16) as NHD secure ranging. Other conventions which fulfill similar concepts are not precluded in the present disclosure.

An advantage of supporting NHD secure ranging can be demonstrated in some use cases. With less fields in the NHD RFRAMEs, the transmit power can be distributed more over the STS to improve the ranging performance. On the other hand, NHD RFRAME may tolerate a worse link budget than that of other two formats which require a higher signal to interference-plus-noise ratio (SINR) to decode the PHR and PHR payload.

However, how to control the NHD secure ranging is not clear yet. As illustrated in IEEE specification, relevant ranging IEs can be directly conveyed in RFRAME to control ranging procedures with the PPDU formats exhibited by FIG. 16 (e.g., (a) and (b)). Since there is no PHR or PHY payload field in the format of FIG. 16 (e.g., (c)), a ranging IEs cannot be embedded to the NHD RFRAME, and new framework/procedure is necessary to support the NHD secure ranging.

In the present disclosure, it may be considered that an UWB network is provided with ranging requests between a group of devices and another group of devices. As illustrated in FIG. 6, one or more devices of group-1 has the ranging request to one or more devices of group-2 or vice versa. To support the NHD secure ranging for a stand-alone UWB network, the present disclosure defines new control IEs and framework of ranging procedures, where existed ranging IEs for time-stamp or angle report can still be used.

Figure 17:
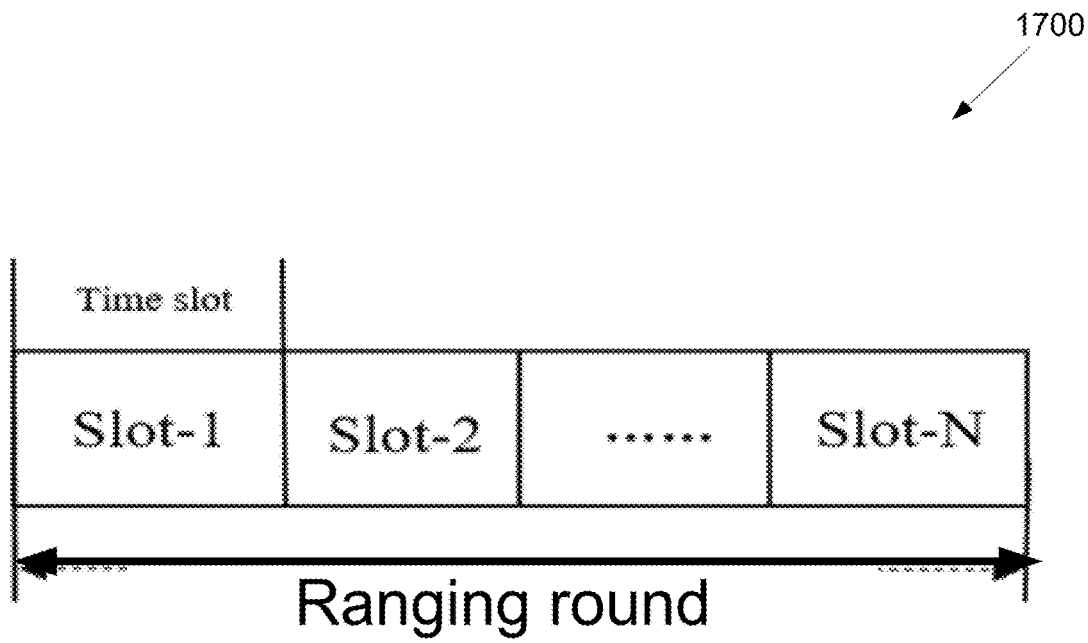
FIG. 17 illustrates an example time structure of ranging round according to embodiments of the present disclosure.

FIG. 17 illustrates an example time structure of ranging round 1700 according to embodiments of the present disclosure. The embodiment of the time structure of ranging round 1700 illustrated in FIG. 17 is for illustration only. FIG. 17 does not limit the scope of the present disclosure to any particular implementation.

A ranging configuration incorporates the control information of a ranging round, which consists of multiple time slots as illustrated in FIG. 17. Time slot is the basic time unit to fulfill a message exchange. Other conventions to fulfill the same functionalities as ranging round and time slot are not precluded in this disclosure. Depending on the device capabilities, slot duration and number of time slots in a ranging round can be adjusted in the ranging configuration, or the slot duration and number of time slots are fixed to a default setting. One or multiple pairs of devices can participate in a ranging round to fulfill the ranging requests.

Figure 18:
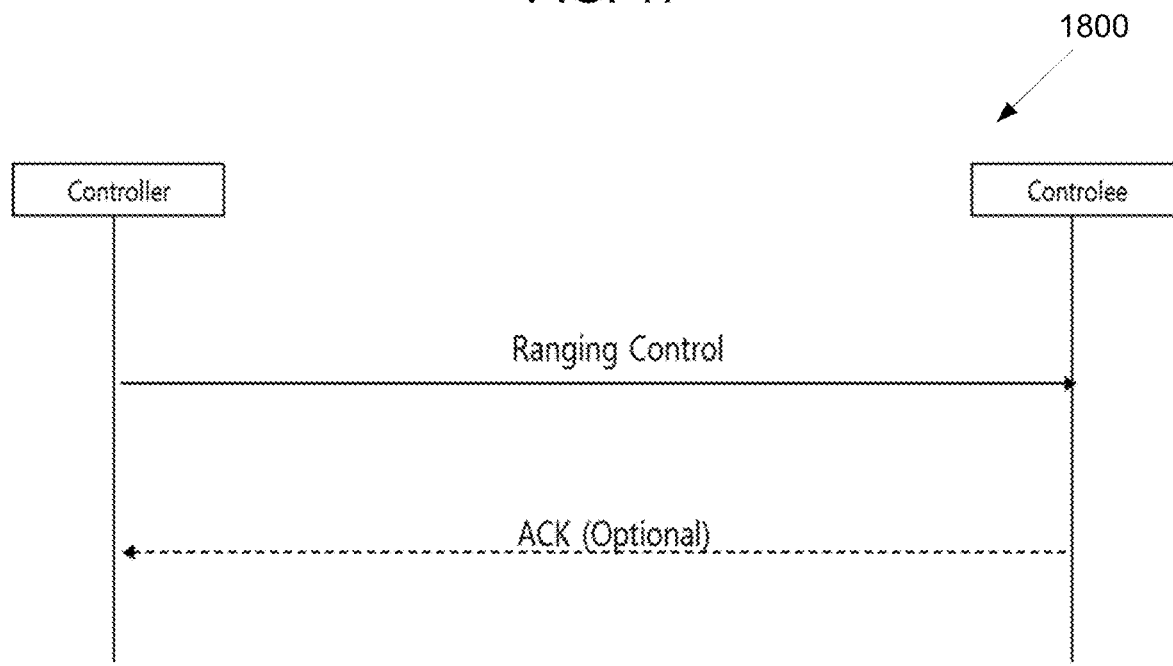
FIG. 18 illustrates an example ranging device nomenclatures (controller and controlee) according to embodiments of the present disclosure.

FIG. 18 illustrates an example ranging device nomenclatures 1800 (controller and controlee) according to embodiments of the present disclosure. The embodiment of the ranging device nomenclatures 1800 illustrated in FIG. 18 is for illustration only. FIG. 18 does not limit the scope of the present disclosure to any particular implementation.

The setting of a ranging configuration determined by the next higher layer can be sent to one or more ranging controlees from a ranging controller (lead device) as illustrated in FIG. 18. With different network formations, the ranging configuration can be conveyed via a dedicated data frame sent to one or more devices, or it can be embedded into a sync frame broadcast to devices in the network. Meanwhile, the present disclosure does not preclude other methods to exchange the ranging configuration information, e.g., via the higher layer or our-of-band management.

Figure 19:
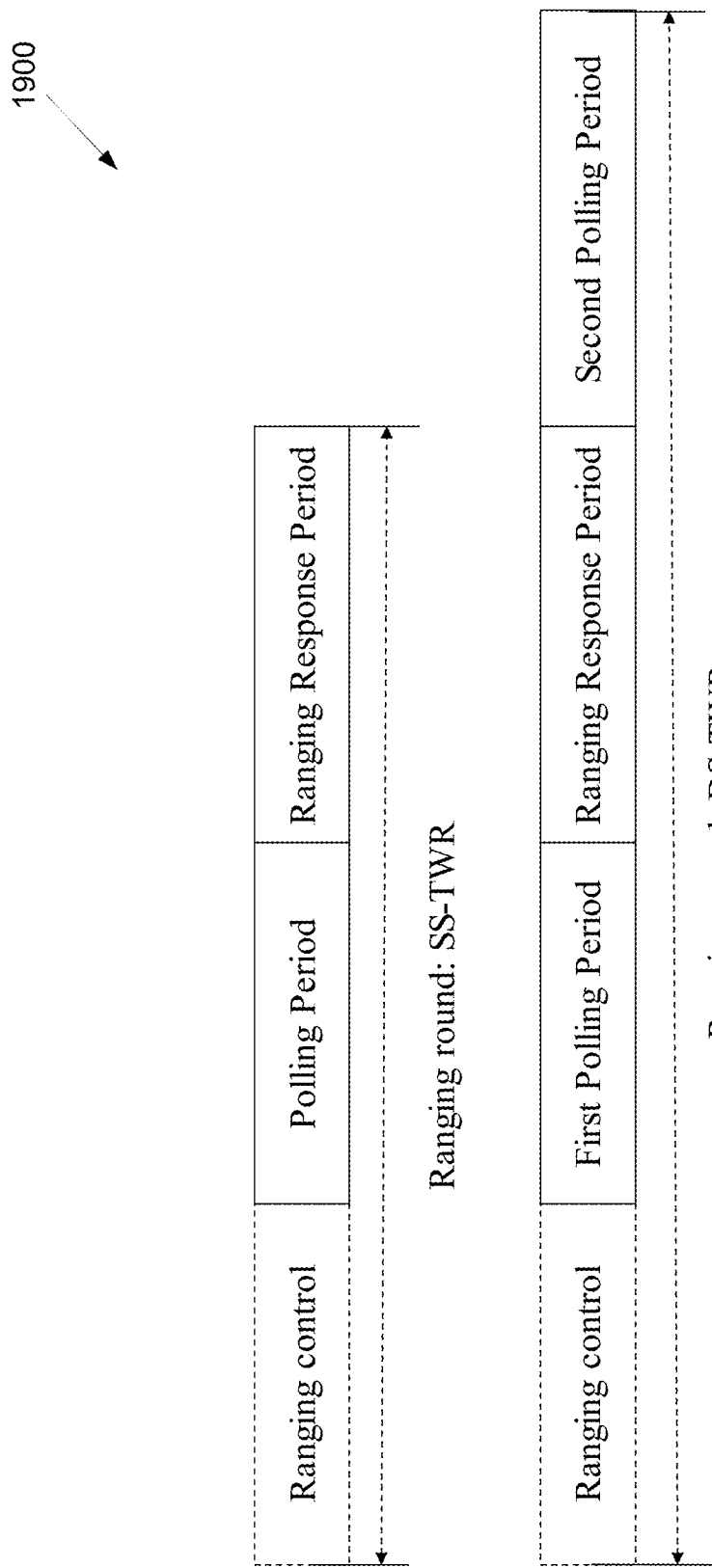
FIG. 19 illustrates an example ranging round structure according to embodiments of the present disclosure.

FIG. 19 illustrates an example ranging round structure 1900 according to embodiments of the present disclosure. The embodiment of the ranging round structure 1900 illustrated in FIG. 19 is for illustration only. FIG. 19 does not limit the scope of the present disclosure to any particular implementation.

A ranging configuration includes the structure of a ranging round which contains one or more polling periods (PP) and one or more ranging response periods (RRP), where a PP consists of one or more time slots to send polling messages from initiator(s), and an RRP consists one or more time slots to send response messages from responder(s).

FIG. 19 respectively illustrates two examples for the SS-TWR and DS-TWR with three message exchanges, other examples are not precluded. A ranging round can start with a ranging control period to exchange the ranging configuration over the UWB MAC. However, a ranging round can also start with a polling period if the ranging configuration is exchanged at the higher layer.

For the SS-TWR, one ranging round contains a PP and an RRP. For the DS-TWR with three messages, one ranging round contains a first PP, an RRP, and a second PP. Each period includes one or more time slots, where transmissions from initiator(s)/responder(s) can be scheduled as determined by the next higher layer or the transmissions from initiator(s)/responder(s) can contend time slots in the corresponding periods, respectively.

FIG. 20 illustrates an example ranging request measurement and control IE content field format 2000 according to embodiments of the present disclosure. The embodiment of the ranging request measurement and control IE content field format 2000 illustrated in FIG. 20 is for illustration only. FIG. 20 does not limit the scope of the present disclosure to any particular implementation.

The ranging request measurement and control IE (RRMC IE) can be used to send ranging requests to different devices, and control ranging procedures. FIG. 20 illustrates the content field format for the RRMC IE, where a row element of the content field format is shown in FIG. 21.

FIG. 21 illustrates an example RRMC table row element format 2100 according to embodiments of the present disclosure. The embodiment of the RRMC table row element format 2100 illustrated in FIG. 21 is for illustration only.

FIG. 21 does not limit the scope of the present disclosure to any particular implementation.

As shown in FIG. 20, the length of the RRMC IE content field determines the presence of the RRMC table length and RRMC table fields: if the RRMC IE's length is one octet, the RRMC table length and RRCM table are not present; if the length is more than one octet, the RRMC table length and RRMC table are present. The RRMC table length equals the number of row elements in the RRMC table, which is the same as the number of devices receiving requests.

If the RRMC IE is conveyed in a unicast frame, the destination address has been specified by the MHR. Therefore, the RRMC table length and RRMC table fields are not needed. When the RRMC IE is conveyed in a broadcast message, the device sending this IE intends to request the devices receiving the IE, then RRMC table length and RRMC table fields are not needed either. However, if the requesting device expects responses from a specified set of devices, RRMC table length and RRMC table fields are present to list addresses of those devices.

A reply time request (RTR) field denotes whether the reply time of ERDEV sending response to the message with this RRMC IE is requested: if the RTR field value is one, the reply time is requested, otherwise it is not.

A round-trip measurement request (RMR) field indicates whether the round-trip measurement of ERDEV upon receiving the message with this RRMC IE is requested: if RMR field value is one, the round-trip measurement is requested, otherwise it is not.

A TOF request (TOFR) field denotes whether the ranging result, i.e., time-of-flight, is requested: if TOFR field value is one, the ranging result is requested, otherwise it is not. For the SS-TWR, the Initiator is able to calculate the TOF after the ranging transmissions. The responder can request the TOF by setting the TOFR field to be one in the RRMC IE of the ranging response message. For the DS-TWR, the responder is able to calculate the TOF after the ranging. The initiator can request the TOF by setting the TOFR field to be one in the RRMC IE of the ranging initiation message.

Fields of AOA Azimuth request (AAR) and AOA elevation request (AER) denote whether azimuth AOA, elevation AOA are requested or not: if the field value is one, the corresponding information is requested, otherwise it is not.

With the content field format as shown in the FIG. 20, if a device requests different sets of information from different destinations, multiple RRMC IEs can be used in a broadcast message, where different RRMC IEs are used to exchange different sets of requests.

In FIG. 21, the address type, i.e., 2-octet or 8-octet address, can be specified by the DstAddrMode of MCPS-DATA.request.

The value of the ranging control information field is illustrated in the following TABLE 3, which is used to indicate the usage of the RFRAME.

TABLE 3

Values of the ranging control information field in the RRMC IE

| Control Info value | Meaning |
| --- | --- |
| 0 | This RFRAME is the ranging initiation message for the SS-TWR. |
| 1 | This RFRAME is responding to the ranging initiation message of SS-TWR |
| 2 | This RFRAME is the ranging initiation message for the DS-TWR. |

TABLE 3-continued

Values of the ranging control information field in the RRMC IE

| Control Info value | Meaning |
| --- | --- |
| 3 | This RFRAME transmitted from ranging responder is continuing the DS-TWR and initiating the second roundtrip measurement. |

The ranging measurement info IE (RMI IE) can be used to send ranging-related measurements to one or more devices. FIG. 20 illustrates the content field format for the RMI IE, where the RMI IE's row element is shown in FIG. 22.

Figure 22:
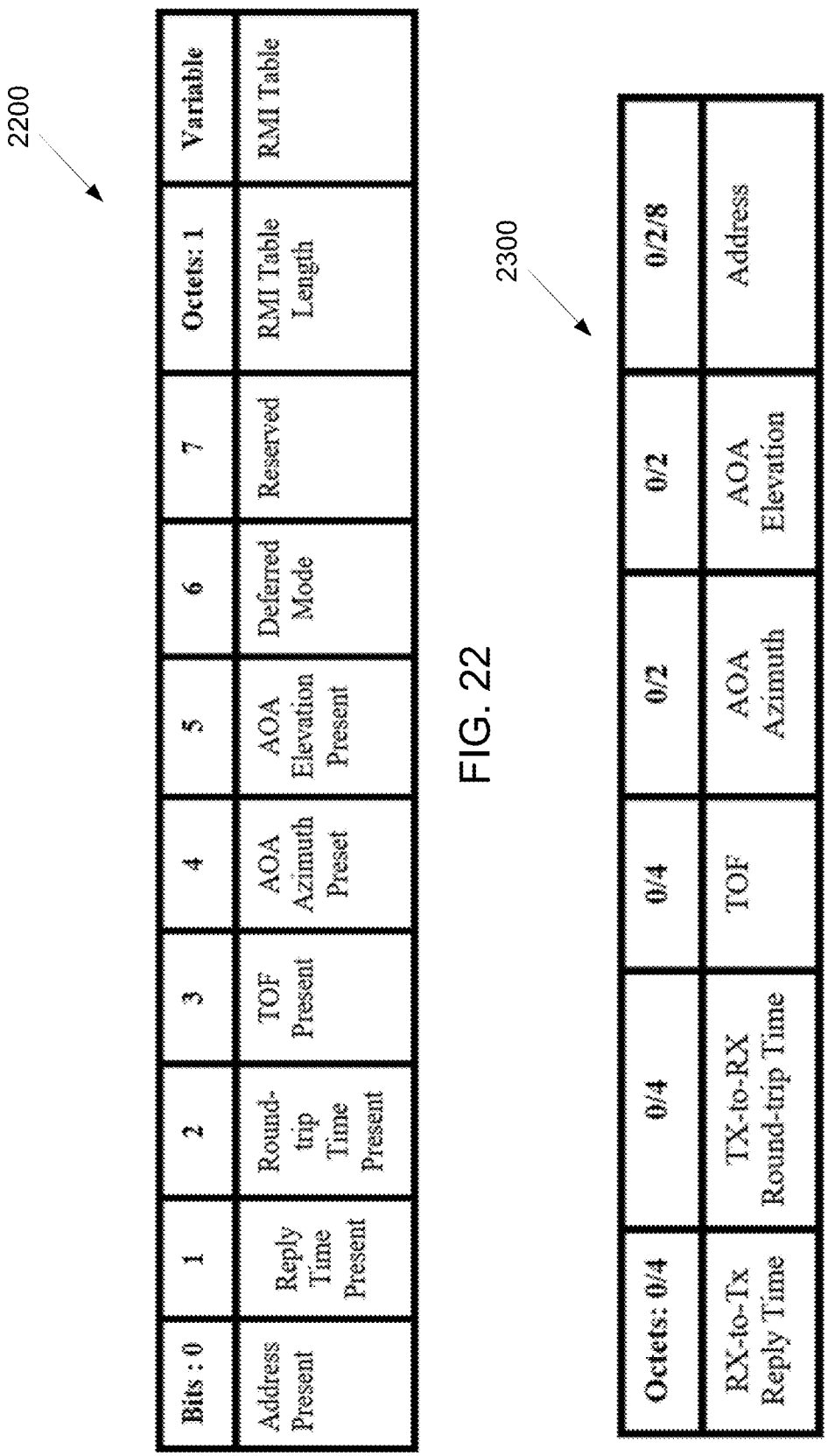
FIG. 22 illustrates an example ranging measurement information IE content field format according to embodiments of the present disclosure.

FIG. 22 illustrates an example ranging measurement information IE content field format 2200 according to embodiments of the present disclosure. The embodiment of the ranging measurement information IE content field format 2200 illustrated in FIG. 22 is for illustration only. FIG. 22 does not limit the scope of the present disclosure to any particular implementation.

Figure 23:
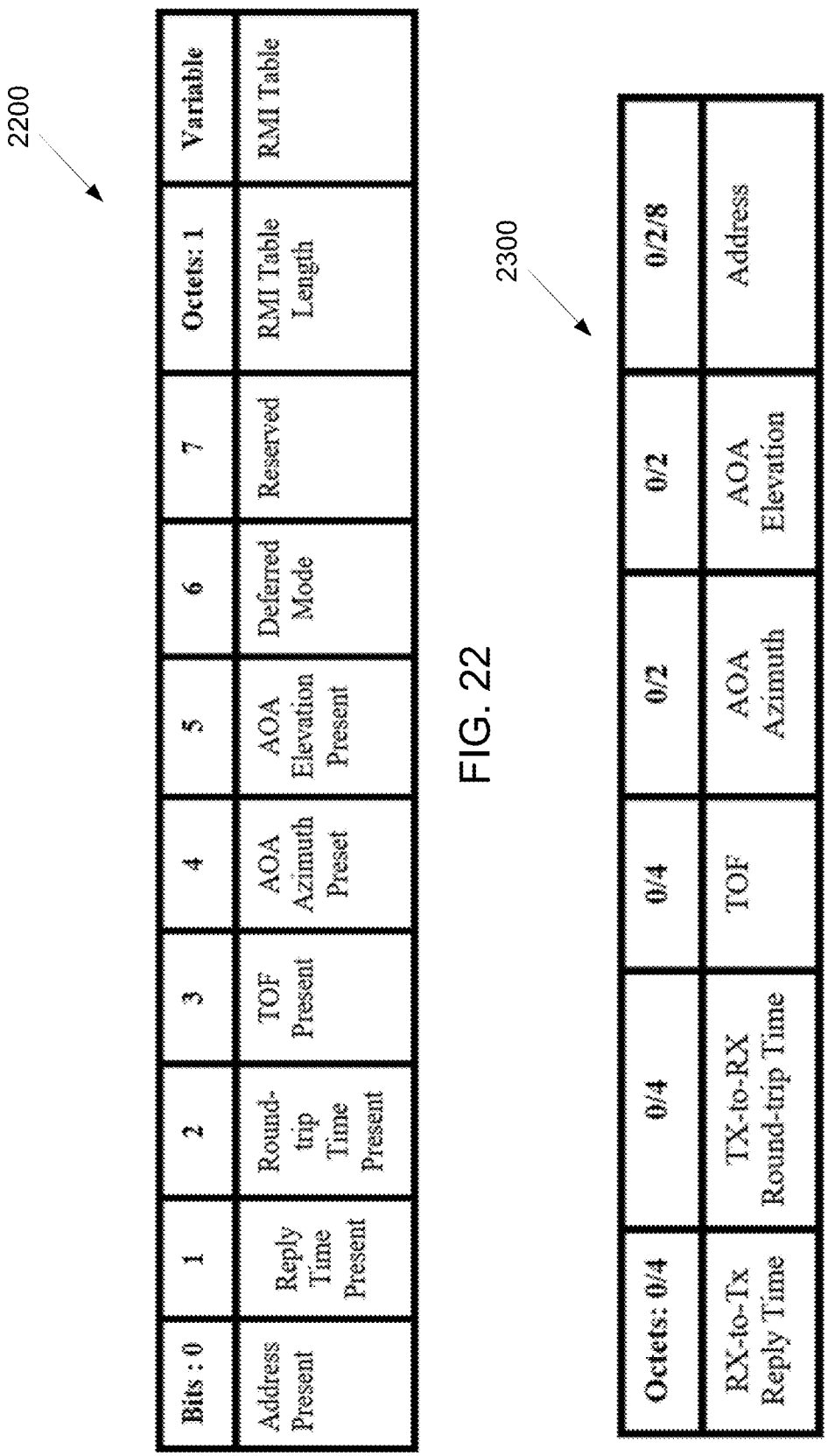
FIG. 23 illustrates an example RMI table row element format according to embodiments of the present disclosure.

The first bit of the control octet, i.e., an address present field, in FIG. 22 is used to indicate whether the address field is present in each row element of the RMI table as shown in FIG. 23: if the address present field value is one, the address field of RMI table row element is present, otherwise it is not. For multi-node ranging, an ERDEV can report measurements via an RMI IE, which lists measurement reports to different destinations in the RMI table. The address field of the RMI table row element is used to distinguish ERDEV that requested certain information. For the unicast ranging, the address field may be omitted.

FIG. 23 illustrates an example RMI table row element format 2300 according to embodiments of the present disclosure. The embodiment of the RMI table row element format 2300 illustrated in FIG. 23 is for illustration only. FIG. 23 does not limit the scope of the present disclosure to any particular implementation.

Bit 1-5 are used to denote whether certain information is present in the row element of the RMI table: if the field value is one, the corresponding information is presented in each row element of the RMI Table, otherwise it is not.

Bit 6 of the control octet is used to indicate whether this RMI IE is conveyed in the RFRAME, or in a deferred data message: if a value of the Bit 6 is zero, this RMI IE is embedded in the RFRAME, otherwise it is conveyed in a deferred data message.

In FIG. 23, the RX-to-TX reply time field is the time difference between the receive time of most recently received RFRAME with the RRMC IE from a particular source to request reply time, and the transmit time of the response RFRAME. If the deferred mode field value is zero, the RMI IE reporting the reply time is embedded in the responding RFRAME. If the deferred mode filed value is one, the RMI IE is embedded in a deferred data message, while the conveyed reply time is associated with the most recently transmitted RFRAME before this data message. The TX-to-RX round-trip time field is the time difference between the transmit time of the RFRAME initiating a roundtrip measurement and the receive time of the response RFRAME that completes a roundtrip measurement. The TOF field contains the time-of-flight estimate.

The reference for these time values, i.e., reply time, roundtrip time, and TOF, is the RMARKER. These time values are unsigned integer time values, whose time units are ranging counter time unit specified in the IEEE standard specification.

The AOA Azimuth field, if present, reports the estimated angle of arrival in the azimuth domain of the received RFRAME with the RRMC IE to request azimuth AOA. The AOA elevation field, if present, reports the estimated angle of arrival in the elevation domain of the received RFRAME with the RRMC IE to request elevation AOA. These fields to report AOA contain unsigned integers. The unit of AOA Azimuth is $2^{-16}$ multiplying 360 degree, while the unit of AOA elevation is $2^{-16}$ multiplying 180 degree.

If an address field is present in each row element of the RMI table, the address type, i.e., 2-octet or 8-octet address, may be specified by the DstAddrMode of MCPS-DATA.request.

Figure 24:
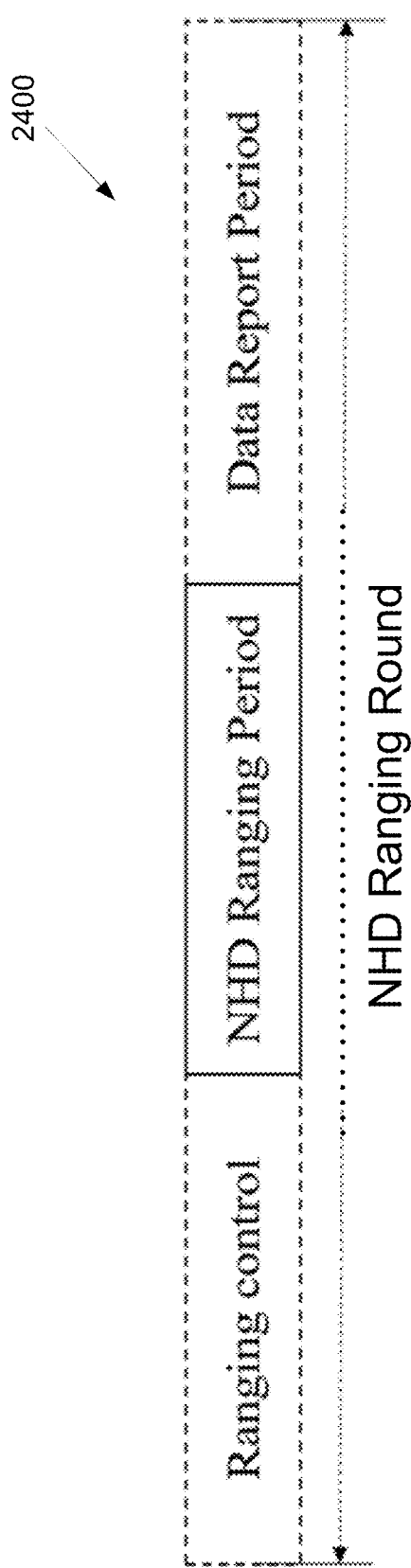
FIG. 24 illustrates an example NHD ranging round structure according to embodiments of the present disclosure.

FIG. 24 illustrates an example NHD ranging round structure 2400 according to embodiments of the present disclosure. The embodiment of the NHD ranging round structure 2400 illustrated in FIG. 24 is for illustration only. FIG. 24 does not limit the scope of the present disclosure to any particular implementation.

In one embodiment 0, time structure of NHD secure ranging round is provided. The time structure of NHD secure ranging round can be configured as FIG. 24.

The controller can acquire requests from different controlees respectively, via higher layer or out-of-band management. This disclosure introduces ranging IEs to support NHD secure ranging, which are conveyed in the RC frame/message as FIG. 18. Specifically, these ranging IEs respectively contain the requests for certain information, e.g., AoA, reply time, from requestors to other far ends. Exchanges of these requests can also be performed via the higher layer or out-of-band management, which is not precluded by this disclosure.

Following the ranging configuration in RC frame/message, the NHD ranging is fulfilled over assigned time slots. Note that since there is no PHY payload in NHD RFRAME to distinguish messages from different devices, NHD ranging message exchanges need to be scheduled ahead. Therefore, contention-based NHD ranging cannot be supported. The ranging scheduling assignment can be a separate IE conveyed in the RC frame/message or it's exchanged via the higher layer, which is not restricted by this disclosure.

After the NHD ranging period, ranging devices are scheduled in a sequential order to transmit a data frame in the data report period, which conveys the requested information to different requestors, respectively. Since NHD RFRAME has no PHR or PHY payload, a dedicated data/measurement report can be scheduled to exchange requested information. There can be use cases without requests to the far ends, where the data/measurement report period in the time structure can be removed. For example, a device may estimate the AoA of a far end via the received NHD RFRAME, and the device has no request to the far end.

Figure 25:
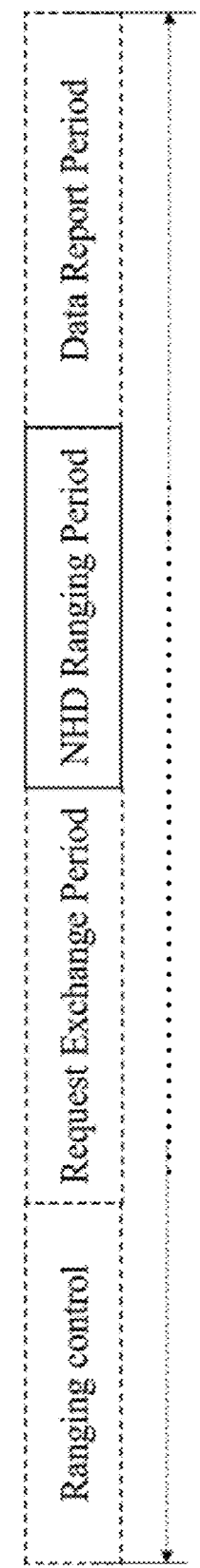
FIG. 25 illustrates an example NHD ranging round structure with request exchange period according to embodiments of the present disclosure.

FIG. 25 illustrates an example NHD ranging round structure with request exchange period 2500 according to embodiments of the present disclosure. The embodiment of the NHD ranging round structure with request exchange period 2500 illustrated in FIG. 25 is for illustration only. FIG. 25 does not limit the scope of the present disclosure to any particular implementation.

If the requests cannot be exchanged via higher layer, and the controller cannot acquire requests from different controlees, a request exchange period can be used to exchange requests among devices as FIG. 25.

Specifically, each requestor can be scheduled to send the request IEs in a dedicated data frame to one or more far ends in the request exchange period. The scheduling assignment can be fulfilled by an IE or a payload field in the RC frame, or the scheduling assignment can be scheduled via the higher layer. After the successful exchange of requests, the NHD ranging period starts.

In one embodiment 1, NHD secure ranging IEs are provided. With the knowledge of requests from controlees, controller forms NHD secure ranging IEs related to these requests, and broadcast to the controlees.

FIG. 26 illustrates an example NHD ranging request angle-of-arrival IE content field format 2600 according to embodiments of the present disclosure. The embodiment of the NHD ranging request angle-of-arrival IE content field format 2600 illustrated in FIG. 26 is for illustration only. FIG. 26 does not limit the scope of the present disclosure to any particular implementation.

In one example 1, NHD ranging request angle-of-arrival IE is provided. NHD ranging request AoA (NRRA) IE can be used in RC frame/message to indicate a request of AoA from a requester to a provider. The general IE format can be referred to IEEE specification, while one example of IE content fields is exhibited in FIG. 26.

NRRA IE contains two address fields: one for the requestor, while the other for the provider. Depending on the use cases and device capabilities, different types of address can be used, e.g., 2-octet multicast group address, 6-octet MAC address, and 8-octet extended address. There can be one or more NRRA IEs conveyed in the RC frame/message, which are distinguished by their respective address fields.

For the use case with many initiators and many responders, both address fields are needed to distinguish a pair of devices. However, there are other variations that can save one or two address fields. For example, for the unicast NHD secure ranging, if the controller requests the AoA at the controlee, the controller can send the NRRA IE without content fields in the RC frame, since the pair of requestor and provider can be distinguished by the address fields of MAC frame. For multicast NHD secure ranging (i.e. only one initiator and multiple responders), if the controller is also the initiator, and request AoA report from the controlees/responders, the NRRA IE in the RC frame does not need to incorporate the address field of the requestor, since responders implicitly know that requests are from the initiator/controller.

FIG. 27 illustrates another example NHD ranging request angle-of-arrival 2700 IE content field according to embodiments of the present disclosure. The embodiment of the NHD ranging request angle-of-arrival 2700 illustrated in FIG. 27 is for illustration only. FIG. 27 does not limit the scope of the present disclosure to any particular implementation.

To support various use cases described above, indicators of address presence are introduced in FIG. 27. First two bit-fields denote indicators of requestor address present and provider address present, respectively. Note that the address type can be determined by DstAddrMode of MCPS-DATA.request.

FIG. 28 illustrates yet another example NHD ranging request angle-of-arrival IE content field 2800 according to embodiments of the present disclosure. The embodiment of the NHD ranging request angle-of-arrival IE content field 2800 illustrated in FIG. 28 is for illustration only. FIG. 28 does not limit the scope of the present disclosure to any particular implementation.

Other structures of content fields, which fulfill similar function as the one in FIG. 19, are not precluded by this disclosure. For example, FIG. 28 illustrates that first two bits of an octet are used as address present indicators, while other bits of the octet are reserved.

As illustrated in FIG. 25, a NRRA IE with content fields exhibited in FIG. 26 can be conveyed respectively by different devices' request frames/messages in the request exchange period if the controller does not have the prior knowledge of requests from the controlees.

In this case, both address fields of NRRA IE as FIGS. 26-28 can be neglected, since requestor/provide address has already been determined by source/destination address field of MAC header.

If the controller knows the requests of controlees via the higher layer or out-of-band management, one or more NRRA IE(s) can be used in RC frame/message broadcast by the controller. There can be other variations to convey these requests in the RC frame/message. For example, the NRRA IE may be formed as FIG. 29, where each row of NRRA table respectively contains the address fields of requestor and provider as FIG. 26 (or FIGS. 27 and 28). The NRRA table length indicates the number of rows in the NRRA table, which is equivalent to the number of AoA requests for this ranging round.

FIG. 29 illustrates an example NHD ranging request angle-of-arrival IE content field format 2900 to include one or more requests according to embodiments of the present disclosure. The embodiment of the NHD ranging request angle-of-arrival IE content field format 2900 illustrated in FIG. 29 is for illustration only. FIG. 29 does not limit the scope of the present disclosure to any particular implementation.

FIG. 30 illustrates another example NHD ranging request angle-of-arrival IE content field format 3000 to include one or more requests according to embodiments of the present disclosure. The embodiment of the NHD ranging request angle-of-arrival IE content field format 3000 illustrated in FIG. 30 is for illustration only. FIG. 30 does not limit the scope of the present disclosure to any particular implementation.

Other structures of NRRA IE with a field of NRRA table are not precluded to fulfill similar function. For example, FIG. 30 illustrates that address present fields are at the beginning of NRRA IE, while each row of table remains the same as that of FIG. 26. If a requestor/provider address can be determined by the source/destination address of MAC header, the value of corresponding address present field is zero, and there is no need to include such address in each row of NRRA Table.

FIG. 31 illustrates an example NHD ranging request reply time IE content field format 3100 according to embodiments of the present disclosure. The embodiment of the NHD ranging request reply time IE content field format 3100 illustrated in FIG. 31 is for illustration only. FIG. 31 does not limit the scope of the present disclosure to any particular implementation.

In one example 2, NHD ranging request reply time IE is provided. NHD ranging request reply time (NRRRT) IE can be used in RC frame/message to indicate a request of reply time of NHD RFRAME from a requester to a provider. The general IE format can be referred to IEEE specification, while one example of IE content fields is illustrated in FIG. 31.

Similar to NRRA IE, NRRRT IE contains two address fields: one for the requestor, while the other for the provider. Depending on the use cases and device capabilities, different types of address can be used, e.g., 2-octet multicast group address, 6-octet MAC address, and 8-octet extended address. There can be one or more NRRA IEs conveyed in the RC frame/message, which are distinguished by their respective address fields.

For the use case with many initiators and many responders, both address fields are needed to distinguish a pair of devices. However, there are other variations that can save one or two address fields. For example, for the unicast NHD secure ranging, if the controller requests reply time of the controlee, the controller can send NRRRT IE without content fields in the RC frame, since the pair of requestor and provider can be distinguished by the address fields of MAC frame. For multicast NHD secure ranging (i.e., only one initiator and multiple responders), if the controller is also the initiator, and request reply time of RFRAME from the controlees/responders, NRRRT IE in the RC frame does not need to incorporate the address field of the requestor, since responders implicitly know that requests are from the initiator/controller.

Figure 32:
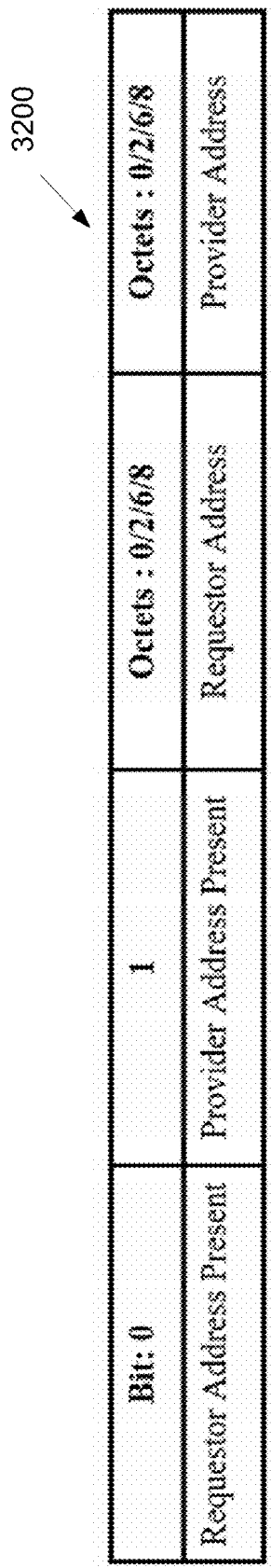
FIG. 32 illustrates another example NHD ranging request reply time IE content field format according to embodiments of the present disclosure.

FIG. 32 illustrates another example NHD ranging request reply time IE content field format 3200 according to embodiments of the present disclosure. The embodiment of the NHD ranging request reply time IE content field format 3200 illustrated in FIG. 32 is for illustration only. FIG. 32 does not limit the scope of the present disclosure to any particular implementation.

To support various use cases described above, indicators of address presence are introduced in FIG. 32. First two bit-fields denote indicators of requestor address present and provider address present, respectively. Note that the address type can be determined by DstAddrMode of MCPS-DATA.request.

Figure 33:
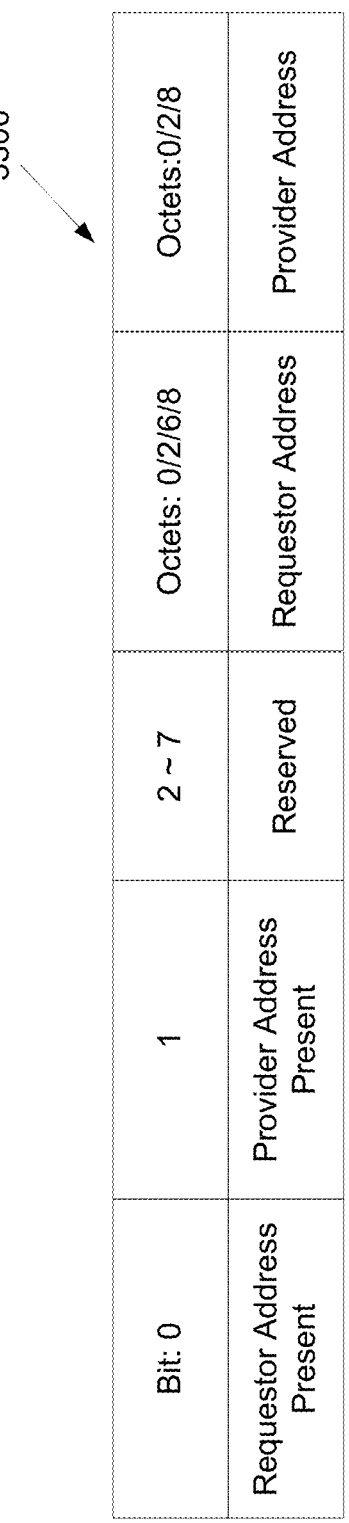
FIG. 33 illustrates yet another example NHD ranging request reply time IE content field format according to embodiments of the present disclosure.

FIG. 33 illustrates yet another example NHD ranging request reply time IE content field format 3300 according to embodiments of the present disclosure. The embodiment of the NHD ranging request reply time IE content field format 3300 illustrated in FIG. 33 is for illustration only. FIG. 33 does not limit the scope of the present disclosure to any particular implementation.

Other structures of content fields, which fulfill similar function as the one in FIG. 24, are not precluded by this disclosure. For example, FIG. 33 illustrates that first two bits of an octet are used as address present indicators, while other bits of the octet are reserved.

In FIG. 25, NRRRT IE with content fields exhibited in FIG. 31 can be conveyed respectively by different devices' request frames/messages in the request exchange period if the controller does not have the prior knowledge of requests from the controlees.

In this case, both address fields of NRRRT IE as FIG. 31-33 can be neglected, since requestor/provide address has already been determined by source/destination address field of MAC header.

Figure 34:
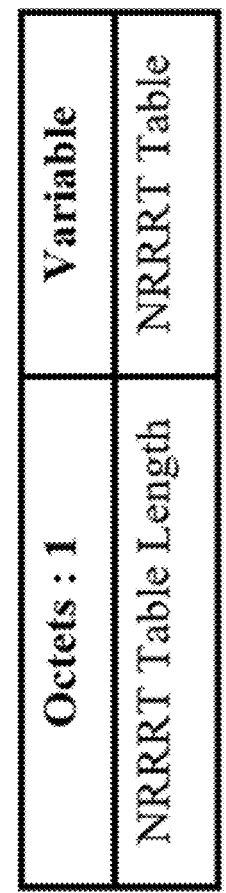
FIG. 34 illustrates an example NHD ranging request reply time IE content field format to include one or more requests according to embodiments of the present disclosure.

FIG. 34 illustrates an example NHD ranging request reply time IE content field format 3400 to include one or more requests according to embodiments of the present disclosure. The embodiment of the NHD ranging request reply time IE content field format 3400 illustrated in FIG. 34 is for illustration only. FIG. 34 does not limit the scope of the present disclosure to any particular implementation.

If the controller knows the requests of controlees via the higher layer or out-of-band management, one or more NRRRT IE(s) can be used in RC frame/message broadcast by the controller. There can be other variations to convey these requests in the RC frame/message. For example, we can form content fields of NRRRT IE as illustrated in FIG.

34, where each row of NRRRT Table respectively contains the address fields of requestor and provider as illustrated in FIG. 31 (or FIGS. 32 and 33). The NRRRT table length indicates the number of rows in the NRRRT Table, which is equivalent to the number of reply time requests for this ranging round.

FIG. 35 illustrates another example NHD ranging request reply time IE content field format 3500 to include one or more requests according to embodiments of the present disclosure. The embodiment of the NHD ranging request reply time IE content field format 3500 illustrated in FIG. 35 is for illustration only. FIG. 35 does not limit the scope of the present disclosure to any particular implementation.

Other structures of NRRRT IE with a field of NRRRT Table are not precluded to fulfill similar function. For example, FIG. 35 illustrates that address present fields are at the beginning of NRRRT IE, while each row of table remains the same as that of FIG. 31. If a requestor/provider address can be determined by the source/destination address of MAC header, the value of corresponding address present field is zero, and there is no need to include such address in each row of NRRRT table.

FIG. 36 illustrates an example NHD ranging request round-trip Measurement IE content field format 3600 according to embodiments of the present disclosure. The embodiment of the NHD ranging request round-trip Measurement IE content field format 3600 illustrated in FIG. 36 is for illustration only. FIG. 36 does not limit the scope of the present disclosure to any particular implementation.

In one example 3, NHD ranging request round-trip measurement IE is provided. NHD ranging request round-trip measurement (NRRR™) IE can be used in RC frame/message to indicate a request of round-trip measurement from a requester to a provider. The general IE format can be referred to IEEE specification, while one example of IE content fields is exhibited in FIG. 36.

Similar to NRRA, NRRRT IE, NRRRTM IE contains two address fields: one for the requestor, while the other for the provider. Depending on the use cases and device capabilities, different types of address can be used, e.g., 2-octet multicast group address, 6-octet MAC address, and 8-octet extended address. There can be one or more NRRA IEs conveyed in the RC frame/message, which are distinguished by their respective address fields.

For the use case with many initiators and many responders, both address fields are needed to distinguish a pair of devices. However, there are other variations that can save one or two address fields. For example, for the unicast NHD secure ranging, if the controller requests round-trip time from the controlee, the controller can send NRRRTM IE without content fields in the RC frame, since the pair of requestor and provider can be distinguished by the address fields of MAC frame. For multicast NHD secure ranging, if the controller is also the initiator of the DS-TWR, and request second round-trip time from the controlees/responders, NRRRTM IE in the RC frame does not need to incorporate the address field of the requestor, since responders implicitly know that requests are from the initiator/controller.

FIG. 37 illustrates an example NHD ranging request round-trip measurement IE 3700 according to embodiments of the present disclosure. The embodiment of the NHD ranging request round-trip measurement IE 3700 illustrated in FIG. 37 is for illustration only. FIG. 37 does not limit the scope of the present disclosure to any particular implementation.

To support various use cases described above, indicators of address presence are introduced in FIG. 37. First two bit-fields denote indicators of requestor address present and provider address present, respectively. Note that the address type can be determined by DstAddrMode of MCPS-DATA.request.

Other structures of content fields, which fulfill similar function as the one in FIG. 37, are not precluded by this disclosure. For example, FIG. 38 illustrates that first two bits of an octet are used as address present indicators, while other bits of the octet are reserved.

FIG. 38 illustrates an example NHD ranging request round-trip measurement IE content field 3800 according to embodiments of the present disclosure. The embodiment of the NHD ranging request round-trip measurement IE content field 3800 illustrated in FIG. 38 is for illustration only. FIG. 38 does not limit the scope of the present disclosure to any particular implementation.

As illustrated in FIG. 25, NRRRTM IE with content fields exhibited in FIG. 36 can be conveyed respectively by different devices' request frames/messages in the request exchange period if the controller does not have the prior knowledge of requests from the controlees. In this case, both address fields of NRRRTM IE as FIG. 36-38 can be neglected, since requestor/provide address has already been determined by source/destination address field of MAC header.

FIG. 39 illustrates an example NHD ranging request round-trip measurement IE content field format 3900 to include one or more requests according to embodiments of the present disclosure. The embodiment of the NHD ranging request round-trip measurement IE content field format 3900 illustrated in FIG. 39 is for illustration only. FIG. 39 does not limit the scope of the present disclosure to any particular implementation.

If the controller knows the requests of controlees via the higher layer or out-of-band management, one or more NRRRTM IE(s) can be used in RC frame/message broadcast by the controller. There can be other variations to convey these requests in the RC frame/message. For example, we can form content fields of NRRRTM IE as illustrated in FIG. 39, where each row of NRRRTM Table respectively contains the address fields of requestor and provider as FIG. 36 (or FIGS. 37 and 38). The NRRRTM table length indicates the number of rows in the NRRRTM table, which is equivalent to the number of round-trip time requests for this ranging round.

Other structures of NRRRTM IE with a field of NRRRTM Table are not precluded to fulfill similar function. For example, FIG. 40 illustrates that address present fields are at the beginning of NRRRTM IE, while each row of table remains the same as that of FIG. 36. If a requestor/provider address can be determined by the source/destination address of MAC header, the value of corresponding address present field is zero, and there is no need to include such address in each row of NRRRTM table.

FIG. 40 illustrates another example NHD ranging request round-trip measurement IE content field format 4000 to include one or more requests according to embodiments of the present disclosure. The embodiment of the NHD ranging request round-trip measurement IE content field format 4000 illustrated in FIG. 40 is for illustration only. FIG. 40 does not limit the scope of the present disclosure to any particular implementation.

Figure 41:
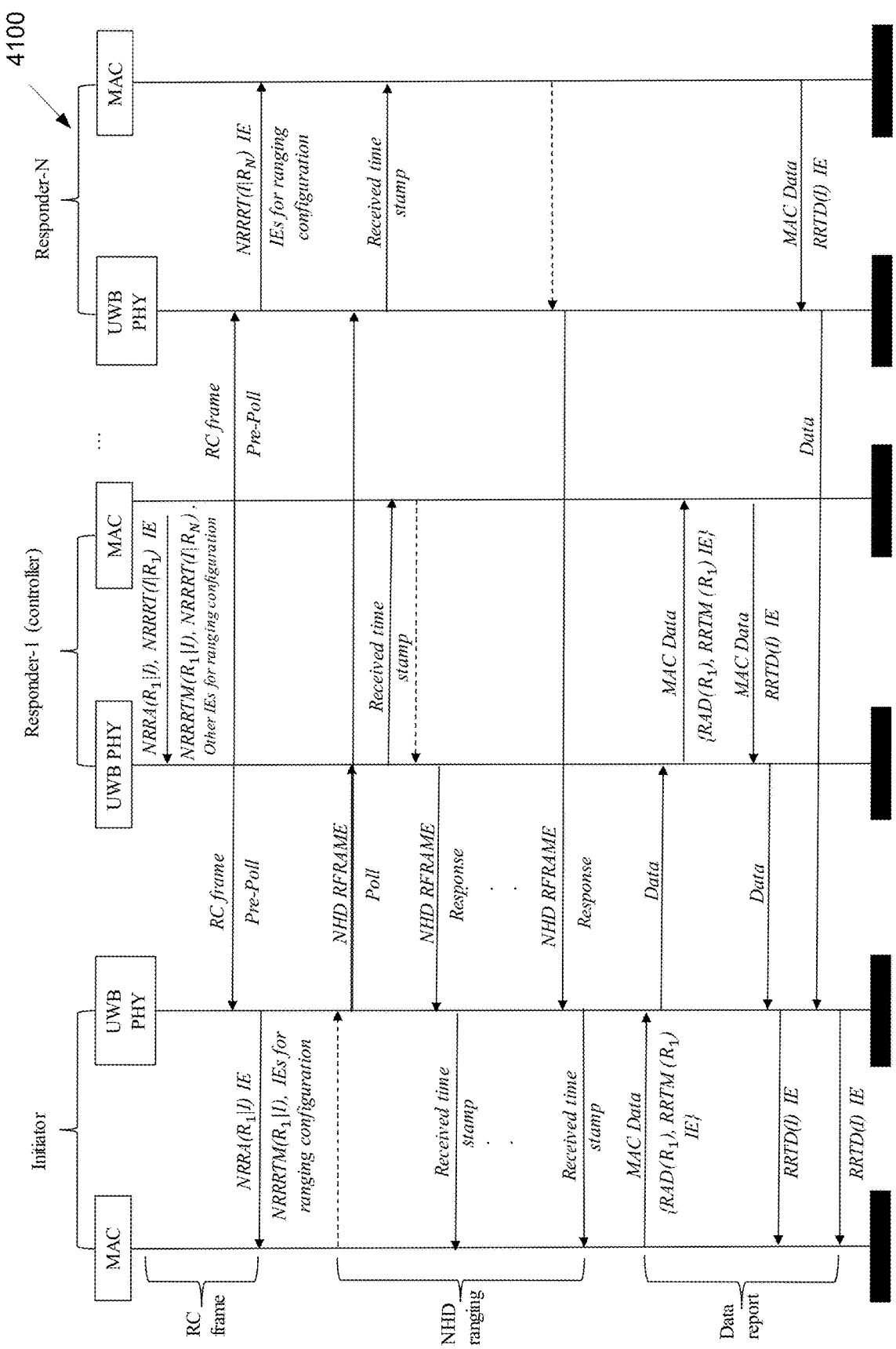
FIG. 41 illustrates an example message exchange chart of NHD ranging (multicast SS-TWR) according to embodiments of the present disclosure.

FIG. 41 illustrates an example message exchange chart 4100 of NHD ranging (multicast SS-TWR) according to embodiments of the present disclosure. The embodiment of the message exchange chart 4100 illustrated in FIG. 41 is for illustration only. FIG. 41 does not limit the scope of the present disclosure to any particular implementation.

Figure 42A:
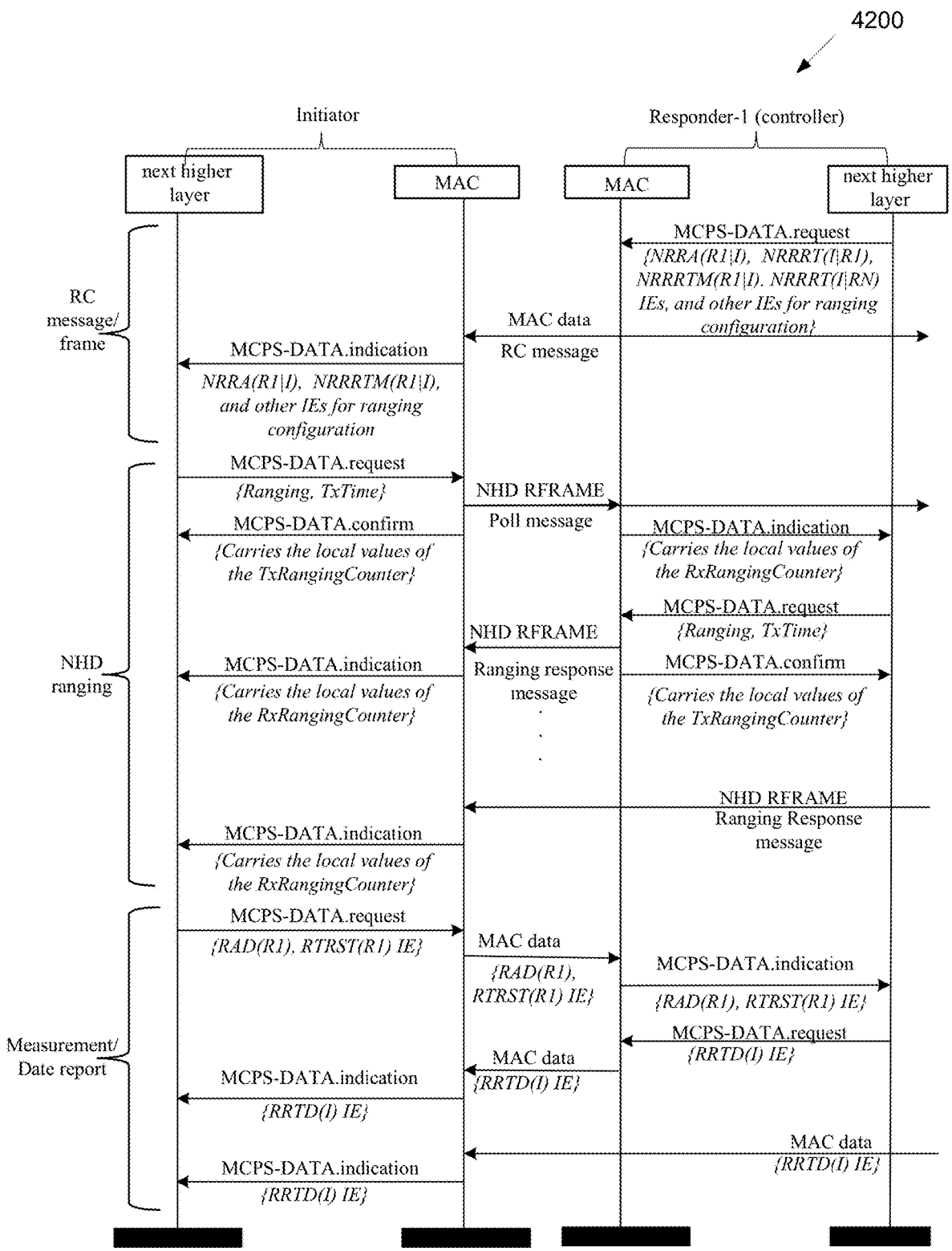
FIG. 42A illustrates an example message sequence chart of NHD ranging with next higher layer (multicast SS-TWR) according to embodiments of the present disclosure.

FIG. 42A illustrates an example message sequence chart 4200 of NHD ranging with next higher layer (multicast SS-TWR) according to embodiments of the present disclosure. The embodiment of the message sequence chart 4200 illustrated in FIG. 42A is for illustration only. FIG. 42A does not limit the scope of the present disclosure to any particular implementation.

Figure 42B:
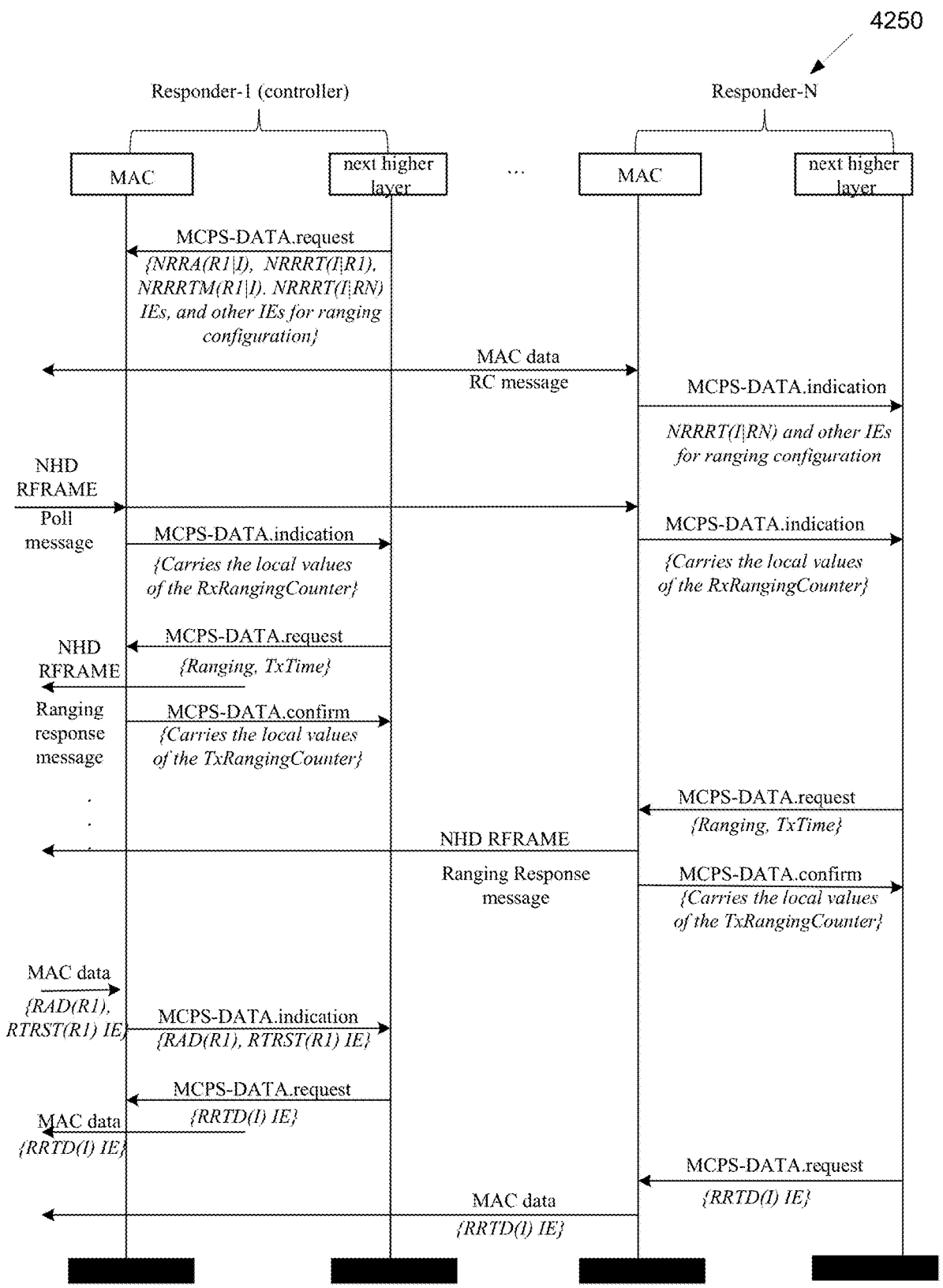
FIG. 42B illustrates an example message sequence chart of NHD ranging with next higher layer (multicast SS-TWR) according to embodiments of the present disclosure.

FIG. 42B illustrates an example message sequence chart 4250 of NHD ranging with next higher layer (multicast SS-TWR) according to embodiments of the present disclosure. The embodiment of the message sequence chart 4250 illustrated in FIG. 42B is for illustration only. FIG. 42B does not limit the scope of the present disclosure to any particular implementation.

Figure 43:
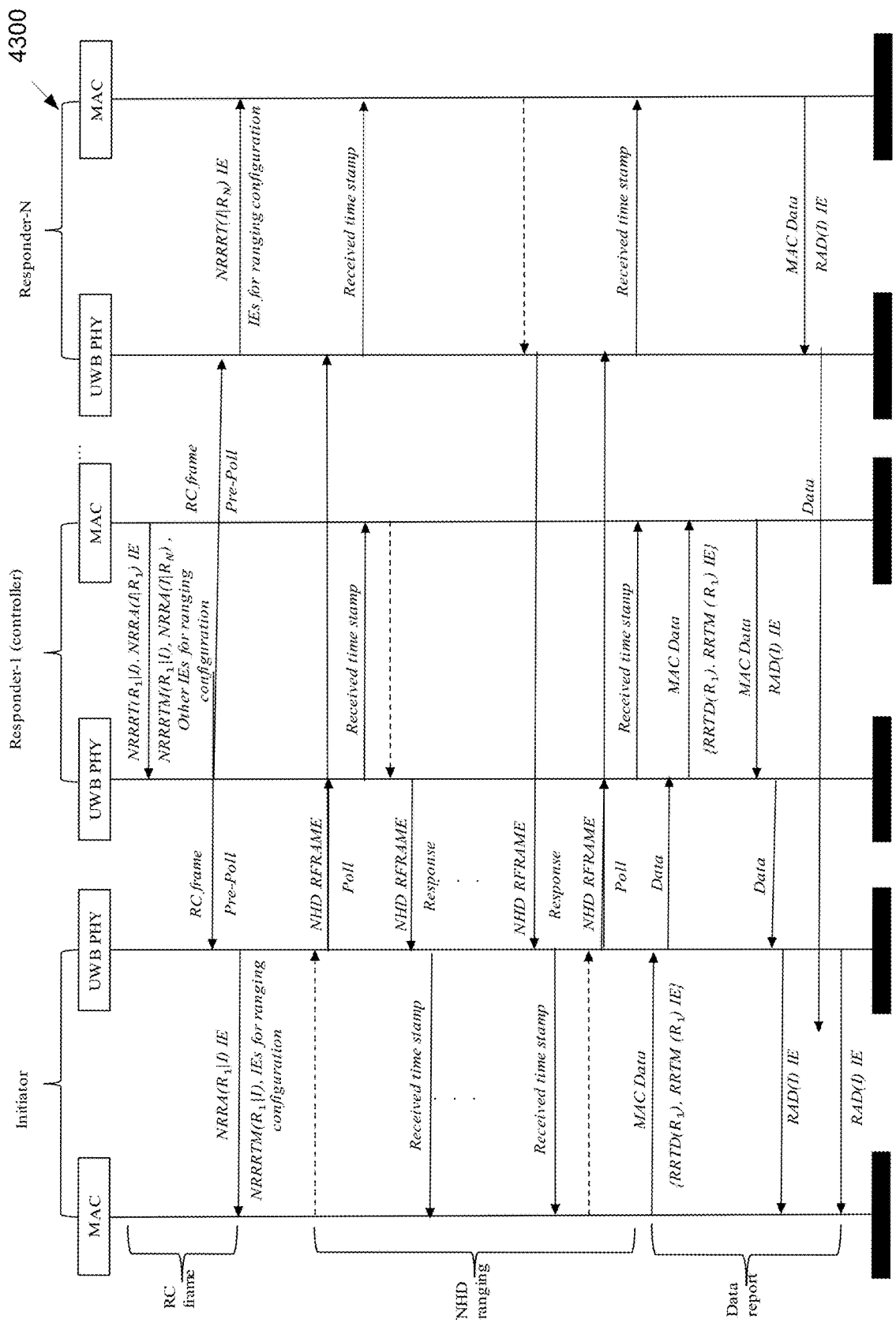
FIG. 43 illustrates an example message exchange chart of NHD ranging (multicast DS-TWR) according to embodiments of the present disclosure.

FIG. 43 illustrates an example message exchange chart 4300 of NHD ranging (multicast DS-TWR) according to embodiments of the present disclosure. The embodiment of the message exchange chart 4300 illustrated in FIG. 43 is for illustration only. FIG. 43 does not limit the scope of the present disclosure to any particular implementation.

Figure 44A:
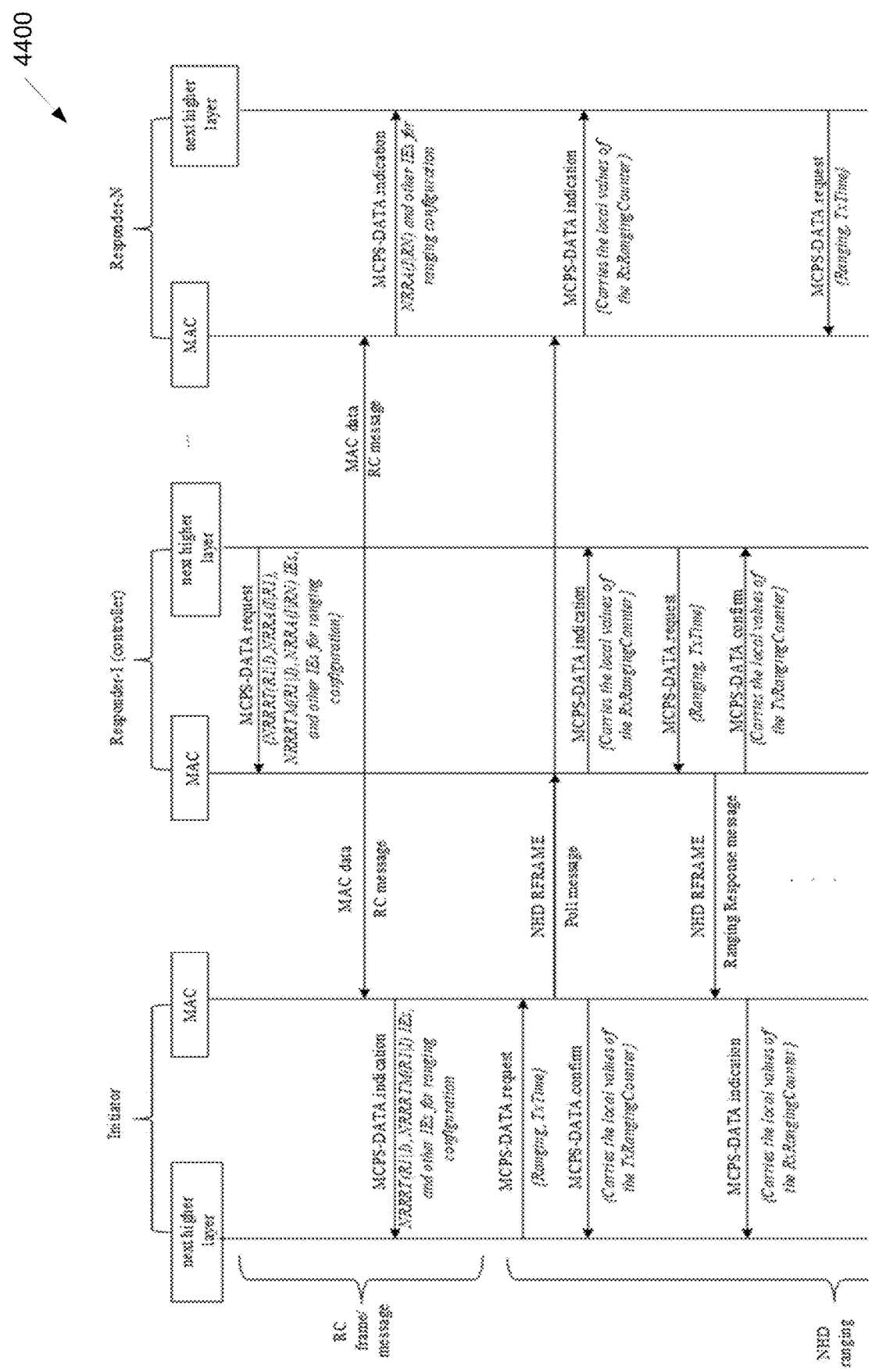
FIG. 44A illustrates an example message sequence chart of NHD ranging with next higher layer (multicast DS-TWR) according to embodiments of the present disclosure.

FIG. 44A illustrates an example message sequence chart 4400 of NHD ranging with next higher layer (multicast DS-TWR) according to embodiments of the present disclosure. The embodiment of the message sequence chart 4400 illustrated in FIG. 44A is for illustration only. FIG. 44A does not limit the scope of the present disclosure to any particular implementation.

Figure 44B:
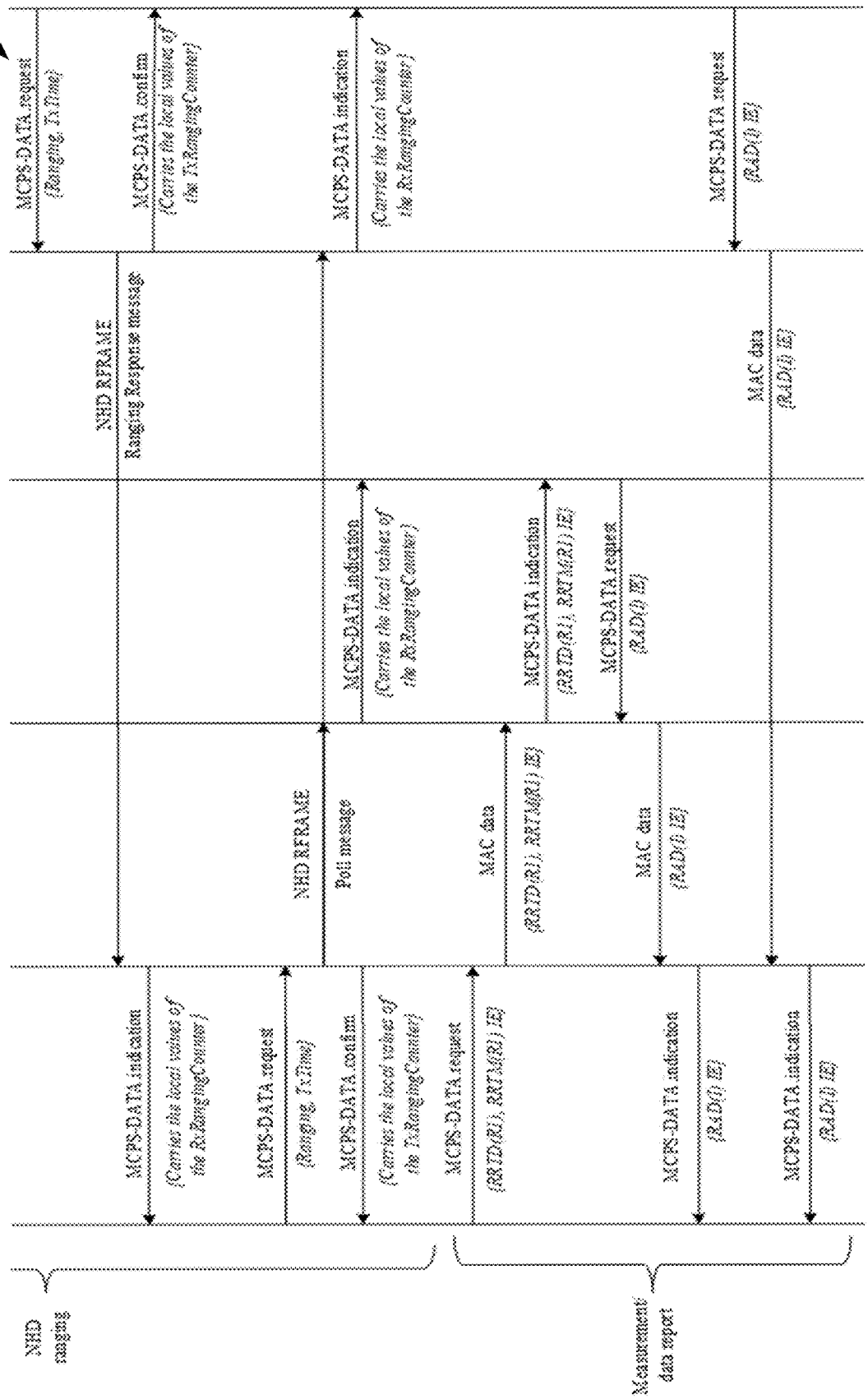
FIG. 44B illustrates an example message sequence chart of NHD ranging with next higher layer (multicast DS-TWR) according to embodiments of the present disclosure.

FIG. 44B illustrates an example message sequence chart 4450 of NHD ranging with next higher layer (multicast DS-TWR) according to embodiments of the present disclosure. The embodiment of the message sequence chart 4450 illustrated in FIG. 44B is for illustration only. FIG. 44B does not limit the scope of the present disclosure to any particular implementation.

In one embodiment, NHD secure ranging procedures is provided. In this embodiment, examples of detailed NHD ranging procedures are illustrated by message exchange charts in FIG. 41 to FIGS. 44A and B, corresponding to the multicast SS-TWR and DS-TWR, respectively. The unicast ranging can be viewed as a special case of the multicast ranging. For the use case with many initiators and many responders, procedures exhibited in this embodiment can also be generalized to accommodate. The present disclosure provides examples of ranging procedures with the round structure exhibited in FIG. 24. Other variations of ranging procedures with the round structure in FIG. 25 are not precluded in this disclosure.

In one example 4, NHD ranging (Multicast SS-TWR) is provided.

FIG. 41 illustrates an example multicast SS-TWR with NHD ranging, which consists of three periods, corresponding to RC frame/message, NHD ranging, and data/measurement report, respectively. "$R_i$" represents the i-th responder, while "I" represents the initiator. In this example, the first responder is the controller, while others are controlees. At the beginning of the ranging round, the RC frame conveys the ranging configuration information, and request-related IEs. For example, NRRA($R_i$|I) indicates that the first responder requests the AoA at the initiator, and NRRRTM ($R_i$|I) denotes that the first responder requests the reply time of RFRAME from the initiator.

After the RC frame/message, the NHD ranging starts. Since ranging scheduling is fulfilled by the RC frame or higher layer ahead of the NHD ranging, the device can know the identity of the far end associated with the received RFRAME. The PHY layer of each device conveys the time-stamp of the received RFRAME to a MAC layer of each device, so that this information can be used to calculate reply time or round-trip time measurement.

After the NHD ranging period, devices are scheduled in the data/measurement report period to send the requested information, where existed ranging IEs in IEEE specification, such as RRTM, RRTD IE. For example, initiator conveys the AoA and round-trip time to the first responder in RAD, RRTM IE, respectively. Responder-1 and responder-N separately embed the requested reply time in the RRTD IE to the initiator.

The controller can also be an initiator and the corresponding message exchange chart is straightforward and is omitted here.

In one example 5, NHD Ranging (Multicast DS-TWR) is provided.

FIG. 43 illustrates an example multicast DS-TWR with NHD ranging, which is similar to FIG. 41. The main difference is that there is a second poll message in the NHD ranging period from the initiator. At the beginning of the ranging round, the requests are broadcast from the controller to controlees. For example, initiator requests the AoA report from both Responder-1 and Responder-N. After the NHD ranging, devices are scheduled to send the data report with the requested information. For example, initiator sends a reply time and round-trip time to the Responder-1, while Responder-1 and Responder-N send the AoA report back to the initiator, respectively. The controller assumes the role of a responder in this example. The controller can also be an initiator and the corresponding message exchange chart is straightforward and is omitted here.

FIG. 45 illustrates an example NHD ranging request report IE content field 4500 according to embodiments of the present disclosure. The embodiment of the NHD ranging request report IE content field 4500 illustrated in FIG. 45 is for illustration only. FIG. 45 does not limit the scope of the present disclosure to any particular implementation.

In one embodiment 3, an NHD secure ranging request is provided.

An NHD ranging request IE introduced in the E1 can also be merged into a single IE, namely NHD Ranging Request Report (NRRR) IE. An example of content field is illustrated in FIG. 45.

In the first one-octet control field, the first bit field is to indicate the presence of requestor address, i.e., "0:" requestor address field is not used; "1:" requestor address field is present. The second bit field is to denote the type of requestor address, e.g., "0:" 2-octet short address; "1:" 8-octet extended address. Other variations of this bit field to include other options of address type are not precluded in this disclosure. Similarly, Bit: 2 and Bit: 3 are used to indicate the presence of provider address and an address type.

Bit: 4-6 are used to present the requests for certain information, i.e., "0:" information of corresponding field is not requested; "1:" information of corresponding field is requested. Therefore, a requestor can request a combination of AOA, reply time, and round-trip measurement via the same IE. The last bit field, i.e., Bit: 7, of the one-octet control field is reserved for future use. The size of last two fields of requester and provider address are determined by the first four bits of the control field.

The content filed structure in FIG. 45 provides flexibility to adjust mixture types of address fields. For example, the requestor address can be a 2-octet short address, while the provider address can be an 8-octet extended address.

FIG. 46 illustrates an example NHD ranging request report IE content field 4600 according to embodiments of the present disclosure. The embodiment of the NHD ranging request report IE content field 4600 illustrated in FIG. 46 is for illustration only. FIG. 46 does not limit the scope of the present disclosure to any particular implementation.

On the other hand, the address type of both requestor and provider can also be determined to be either short address or extended address by DstAddrMode of MCPS-DATA.request. Therefore, fields of address types are not necessary to be included, and the content field of NRRR IE is reduced.

Figure 47:
FIG. 47 illustrates an example NHD ranging request report IE content field with ToF request field according to embodiments of the present disclosure.

FIG. 47 illustrates an example NHD ranging request report IE content field 4700 with ToF request field according to embodiments of the present disclosure. The embodiment of the NHD ranging request report IE content field 4700 illustrated in FIG. 47 is for illustration only. FIG. 47 does not limit the scope of the present disclosure to any particular implementation.

To exchange the requests for final ranging results, i.e., time-of-flight (ToF), from other device(s), a bit-field of ToF request can be added to FIG. 46, which is illustrated in FIG. 47.

1-bit field of ToF request is used to indicate the presence of ToF request, i.e., if a value is "1," the request of ToF is present, otherwise it does not exist. Other fields remain the same as those in FIG. 38. Note that this disclosure does not preclude other bit combinations to request AOA, reply time, round-trip time, and/or ToF.

Figure 48:
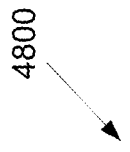
FIG. 48 illustrates an example NHD ranging request report IE content field with an NRRR table according to embodiments of the present disclosure.

FIG. 48 illustrates an example NHD ranging request report IE content field 4800 with an NRRR table according to embodiments of the present disclosure. The embodiment of the NHD ranging request report IE content field 4800 illustrated in FIG. 48 is for illustration only. FIG. 48 does not limit the scope of the present disclosure to any particular implementation.

There can exist requests among different pairs of requestor and provider. On one hand, multiple NRRR IEs with different address fields can be conveyed by the ranging control message. On the other hand, similar to FIG. 39, an NRRR IE can include a table to stack the requests of different ranging pairs. Therefore, the content field of NRRR IE becomes FIG. 48:

The first octet field denotes the number of rows in NRRR Table, which is equivalent to the number of ranging pairs that need to exchange request reports. Each row of NRRR Table follows content field structure of FIG. 45 (or FIGS. 46 and 47).

Figure 49A:
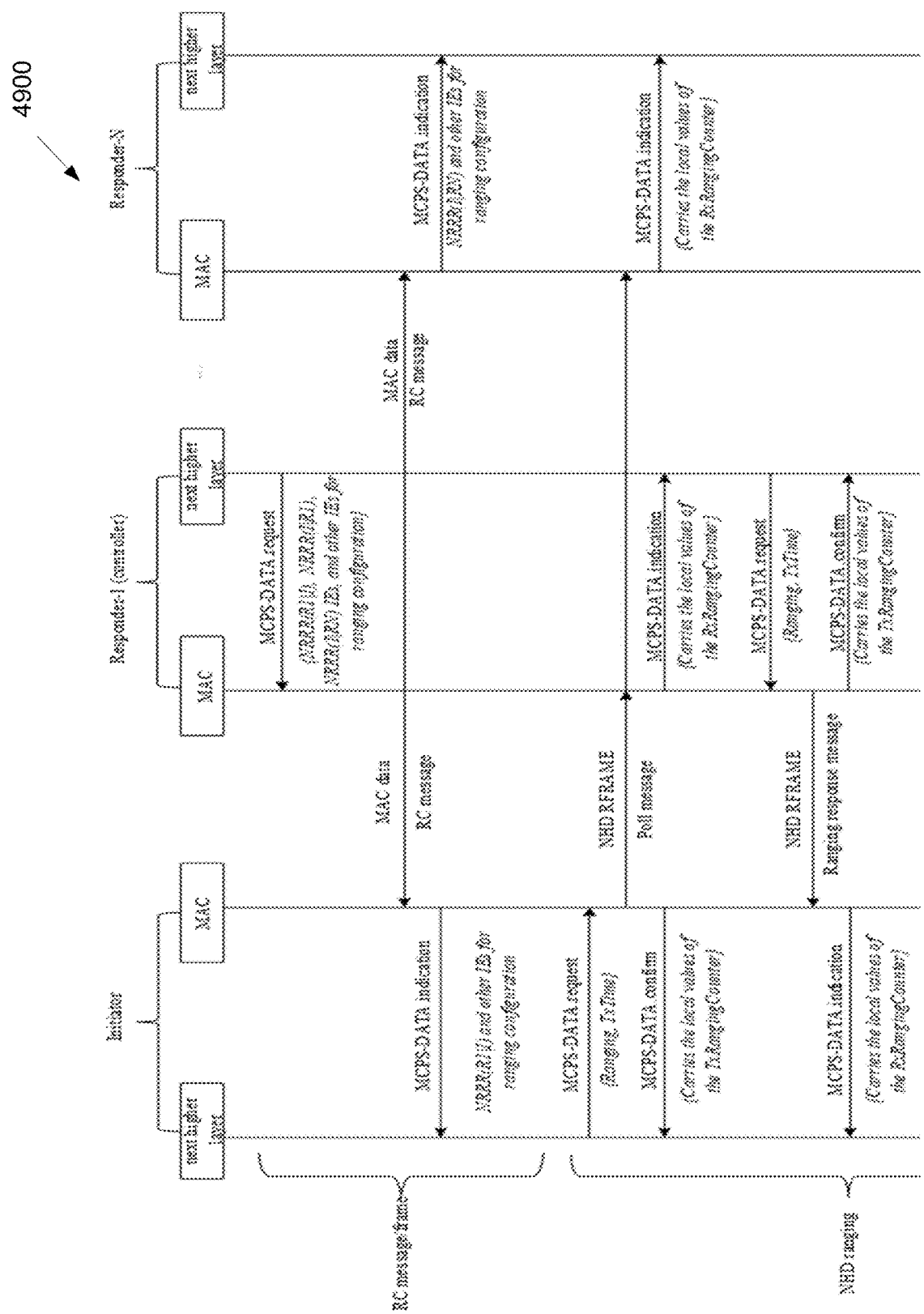
FIG. 49A illustrates an example message sequence chart of NHD ranging with request exchange by NRRR IE (multicast SS-TWR) according to embodiments of the present disclosure.

FIG. 49A illustrates an example message sequence chart 4900 of NHD ranging with request exchange by NRRR IE (multicast SS-TWR) according to embodiments of the present disclosure. The embodiment of the message sequence chart 4900 illustrated in FIG. 49A is for illustration only. FIG. 49A does not limit the scope of the present disclosure to any particular implementation.

Figure 49B:
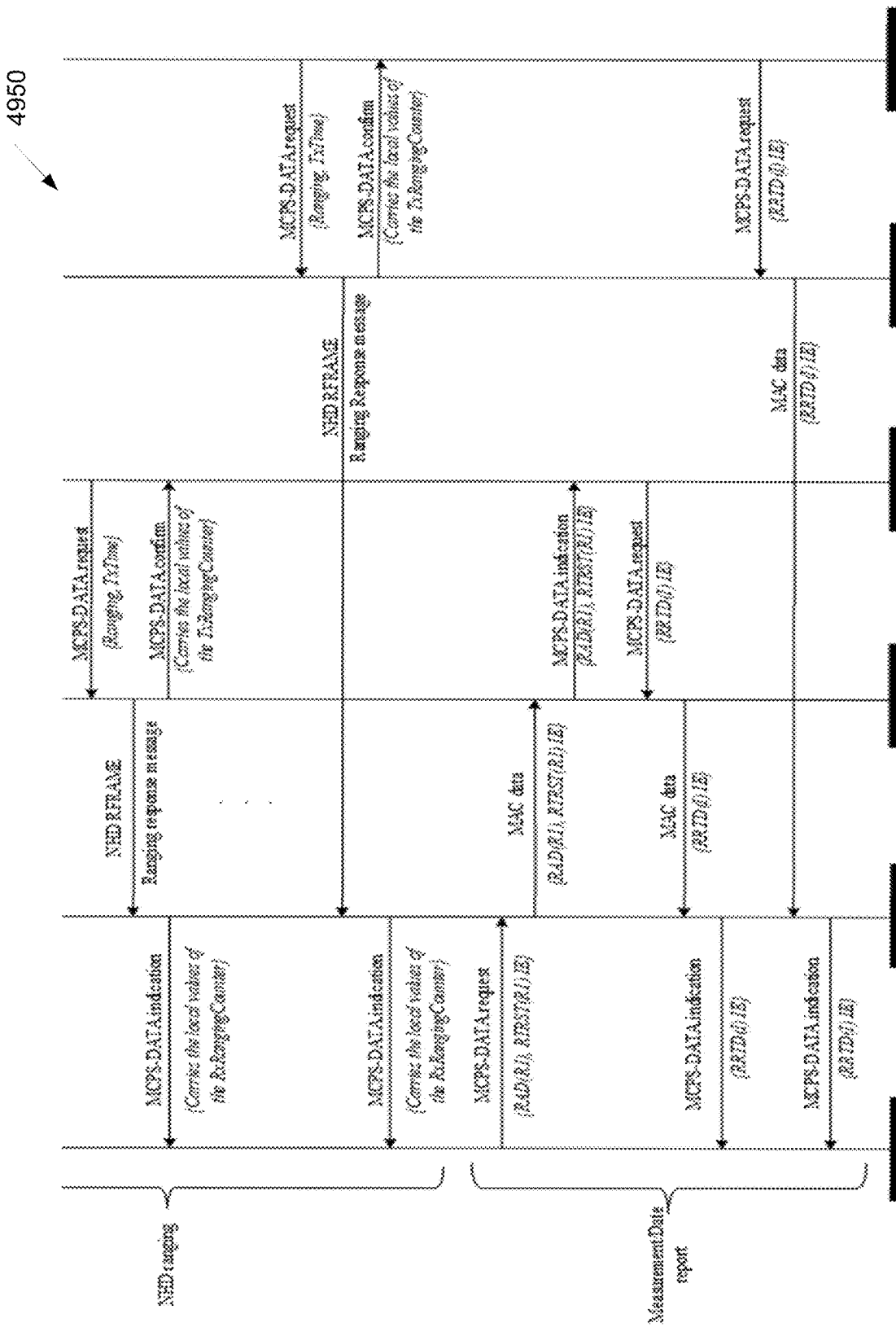
FIG. 49B illustrates an example message sequence chart of NHD ranging with request exchange by NRRR IE (multicast SS-TWR) according to embodiments of the present disclosure.

FIG. 49B illustrates an example message sequence chart 4950 of NHD ranging with request exchange by NRRR IE (multicast SS-TWR) according to embodiments of the present disclosure. The embodiment of the message sequence chart 4950 illustrated in FIG. 49B is for illustration only. FIG. 49B does not limit the scope of the present disclosure to any particular implementation.

Figure 50A:
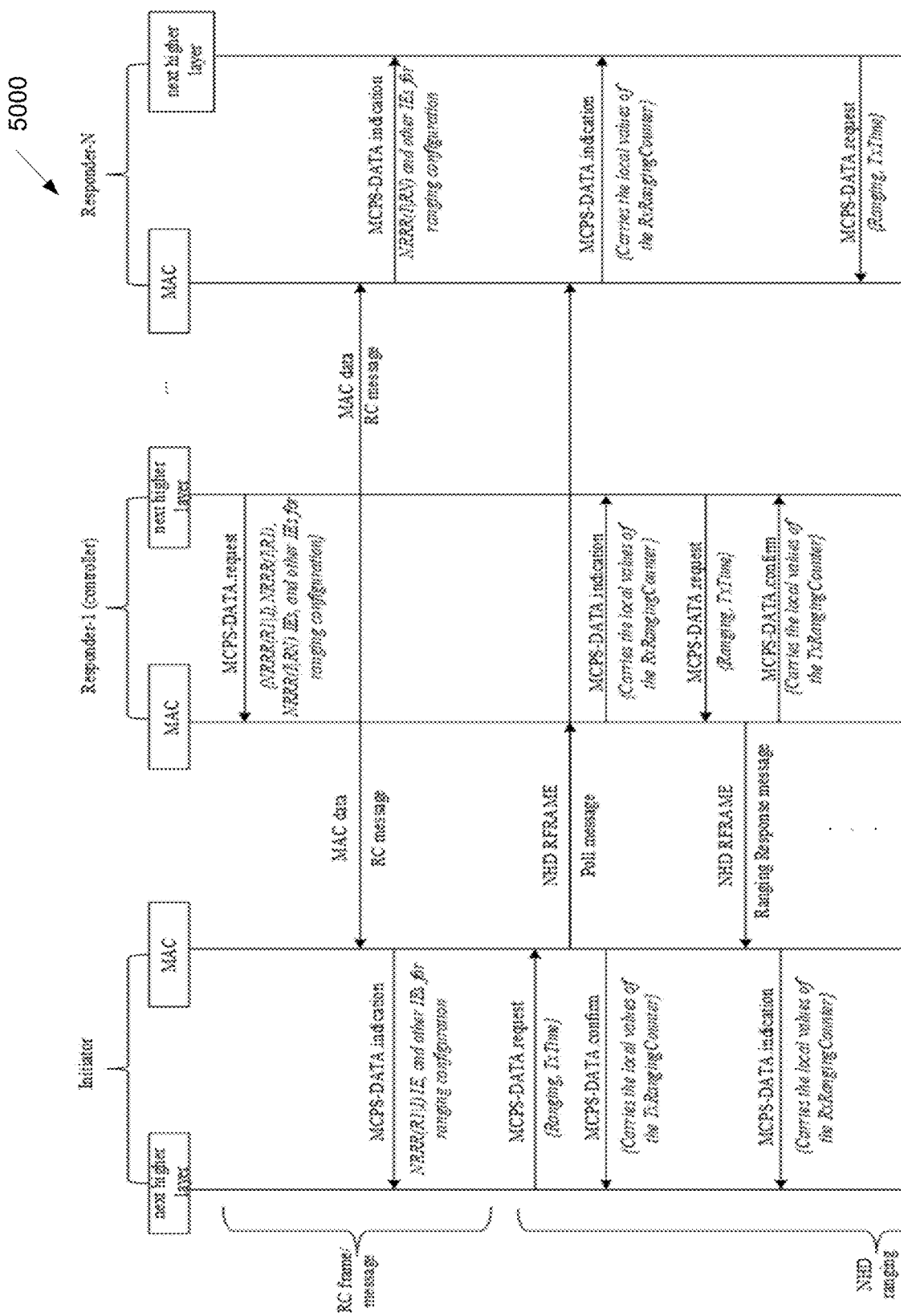
FIG. 50A illustrates an example message sequence chart of NHD ranging with request exchange by NRRR IE (multicast DS-TWR) according to embodiments of the present disclosure.

FIG. 50A illustrates an example message sequence chart 5000 of NHD ranging with request exchange by NRRR IE (multicast DS-TWR) according to embodiments of the present disclosure. The embodiment of the message sequence chart 5000 illustrated in FIG. 50A is for illustration only. FIG. 50A does not limit the scope of the present disclosure to any particular implementation.

Figure 50B:
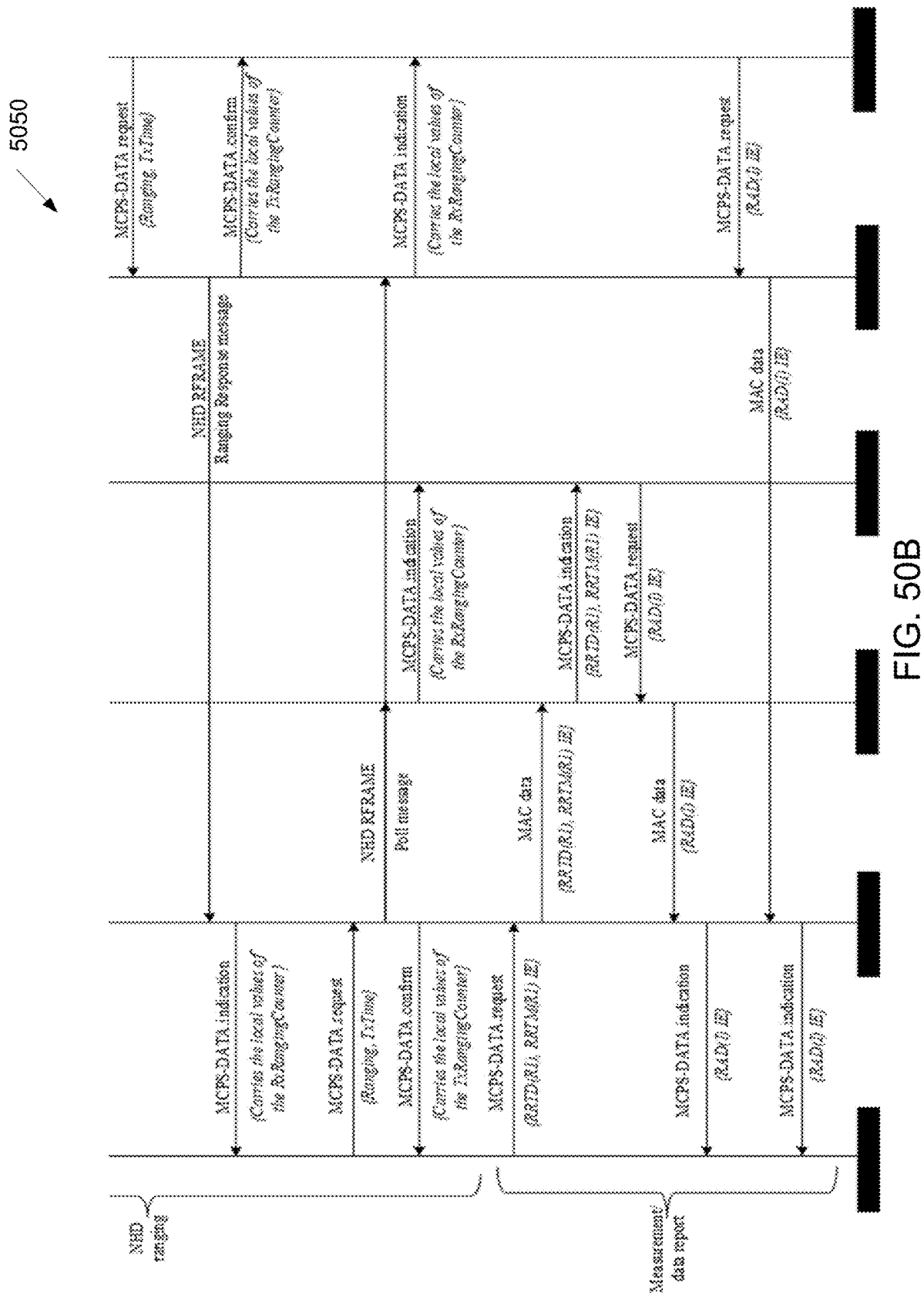
FIG. 50B illustrates an example message sequence chart of NHD ranging with request exchange by NRRR IE (multicast DS-TWR) according to embodiments of the present disclosure.

FIG. 50B illustrates an example message sequence chart 5050 of NHD ranging with request exchange by NRRR IE (multicast DS-TWR) according to embodiments of the present disclosure. The embodiment of the message sequence chart 5050 illustrated in FIG. 50B is for illustration only. FIG. 50B does not limit the scope of the present disclosure to any particular implementation.

Ranging procedures with request exchange via NRRR IE are similar to examples of FIGS. 42A and B, and FIGS. 44A and B. Message sequence charts for multicast SS-TWR and DS-TWR are exhibited in FIGS. 49A and B, and FIGS. 50A and B.

Similar to FIGS. 42A and B, and FIGS. 49A and B illustrate an example multicast SS-TWR with request exchange by NRRR IE, which consists of three periods, corresponding to RC frame/message, NHD ranging, and data/measurement report, respectively. "$R_i$" represents the i-th responder, while "I" represents the initiator. In this example, the first responder is the controller, while others are controlees. At the beginning of the ranging round, the RC frame conveys the ranging configuration information, and request-related IEs. For example, NRRR($R_1$|I) indicates that the first responder requests AoA, reply time, or round-trip measurement at the initiator.

After the RC frame/message, the NHD ranging starts. Since ranging scheduling is fulfilled by the RC frame or higher layer ahead of the NHD ranging, the device can know the identity of the far end associated with the received RFRAME. The PHY layer of each device conveys the time-stamp of the received RFRAME to a MAC layer of each device, so that this information can be used to calculate reply time or round-trip time measurement.

After the NHD ranging period, devices are scheduled in the data/measurement report period to send the requested information, where existed ranging IEs in IEEE specification, such as RRTM, RRTD IE. For example, initiator conveys the AoA and round-trip time to the first responder in RAD, RRTM IE, respectively. Responder-1 and Responder-N separately embed the requested reply time in the RRTD IE to the initiator.

Similar to FIGS. 44A and B, FIGS. 50A and B illustrate an example multicast DS-TWR with request exchange by NRRR IE, which is similar to FIGS. 49A and B. The main difference is that there is a second poll message in the NHD ranging period from the initiator. At the beginning of the ranging round, the requests are broadcast from the controller to controlees.

For example, initiator requests the AoA report from both Responder-1 and Responder-N. After the NHD ranging, devices are scheduled to send the data report with the requested information. For example, initiator sends a reply time and round-trip time to the Responder-1, while Responder-1 and Responder-N send the AoA report back to the initiator, respectively. The controller assumes the role of a responder in this example. The controller can also be an initiator and the corresponding message exchange chart is straightforward and is omitted here.

In one embodiment 4, an NHD ranging procedure with the RMI IE for measurement report is provided.

Figure 51A:
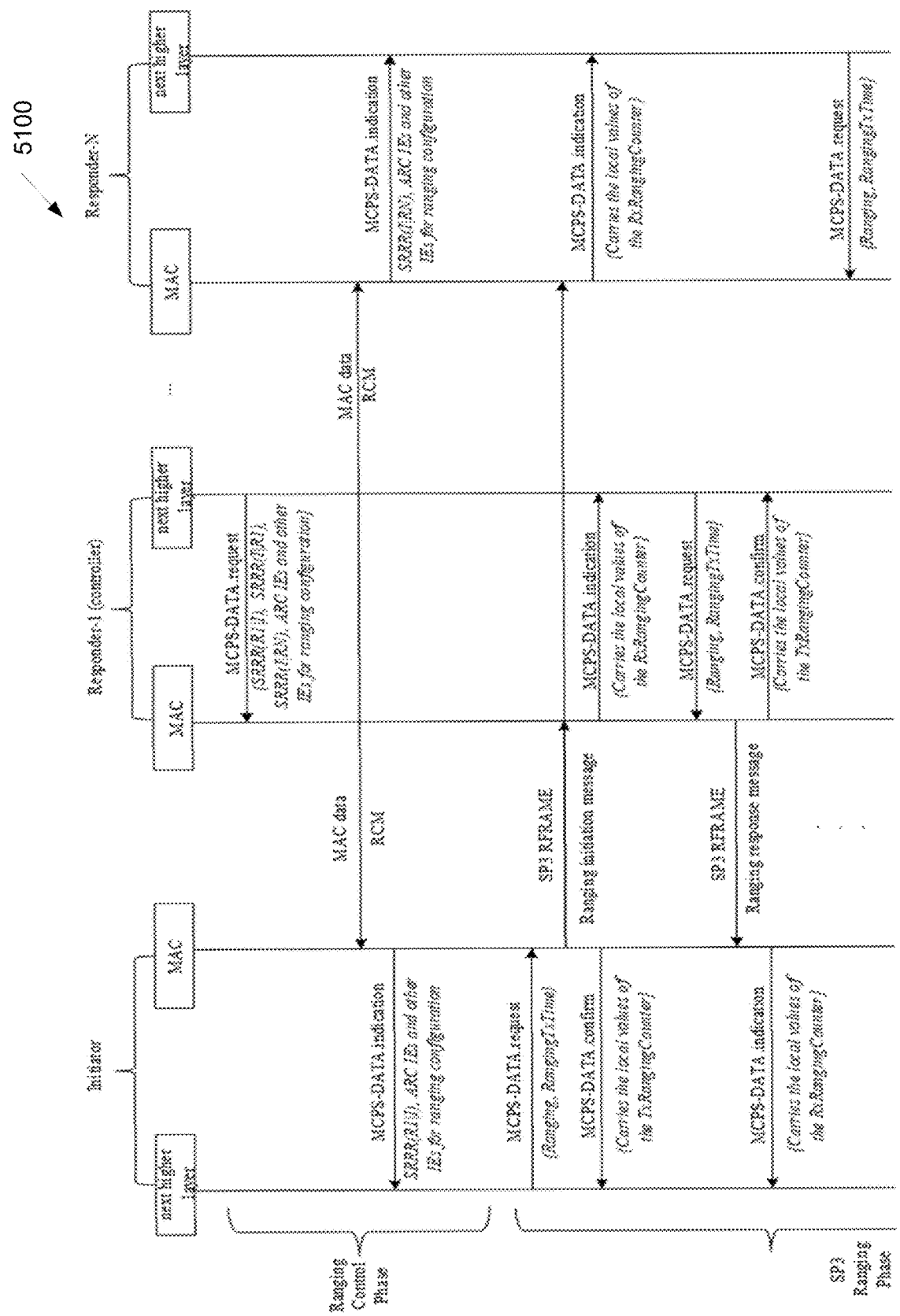
FIG. 51A illustrates an example message sequence chart for SP3 one-to-many SS-TWR according to embodiments of the present disclosure.

FIG. 51A illustrates an example message sequence chart 5100 for SP3 one-to-many SS-TWR according to embodiments of the present disclosure. The embodiment of the message sequence chart 5100 illustrated in FIG. 51A is for illustration only. FIG. 51A does not limit the scope of the present disclosure to any particular implementation.

Figure 51B:
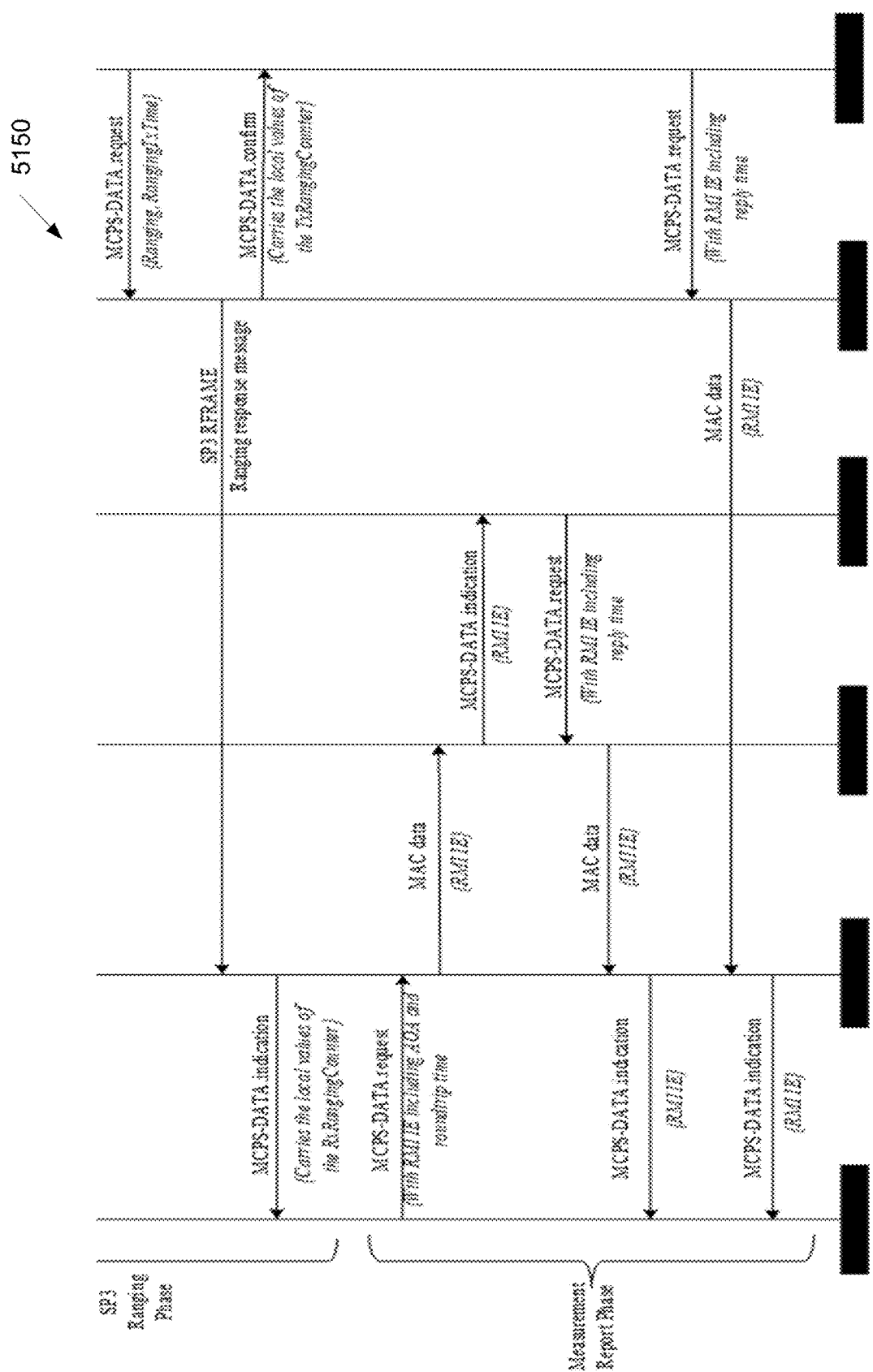
FIG. 51B illustrates an example message sequence chart for SP3 one-to-many SS-TWR according to embodiments of the present disclosure.

FIG. 51B illustrates an example message sequence chart 5150 for SP3 one-to-many SS-TWR according to embodiments of the present disclosure. The embodiment of the message sequence chart 5150 illustrated in FIG. 51B is for illustration only. FIG. 51B does not limit the scope of the present disclosure to any particular implementation.

Figure 52A:
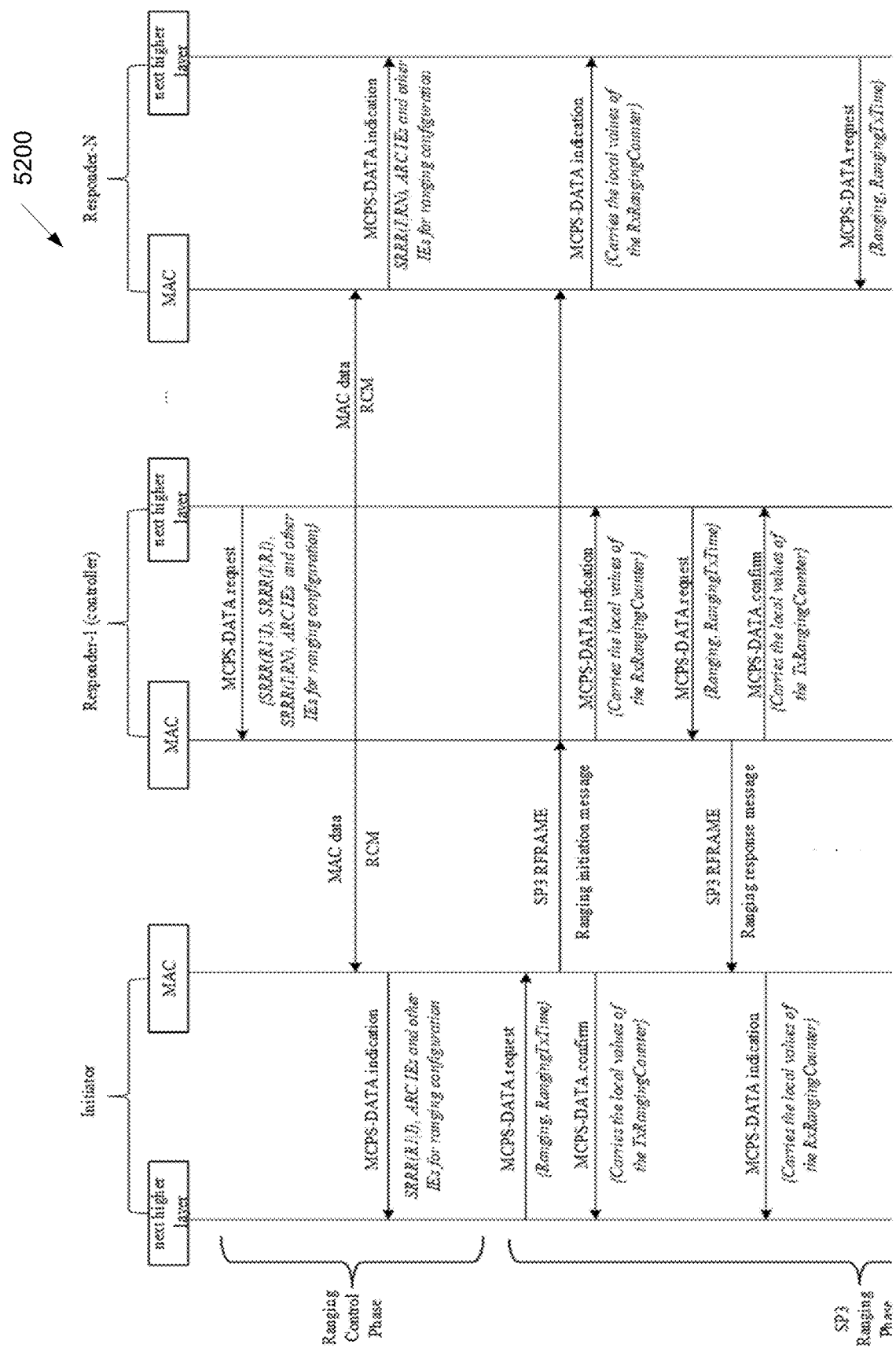
FIG. 52A illustrates an example message sequence chart for SP3 one-to-many DS-TWR according to embodiments of the present disclosure.

FIG. 52A illustrates an example message sequence chart 5200 for SP3 one-to-many DS-TWR according to embodiments of the present disclosure. The embodiment of the message sequence chart 5200 illustrated in FIG. 52A is for illustration only. FIG. 52A does not limit the scope of the present disclosure to any particular implementation.

Figure 52B:
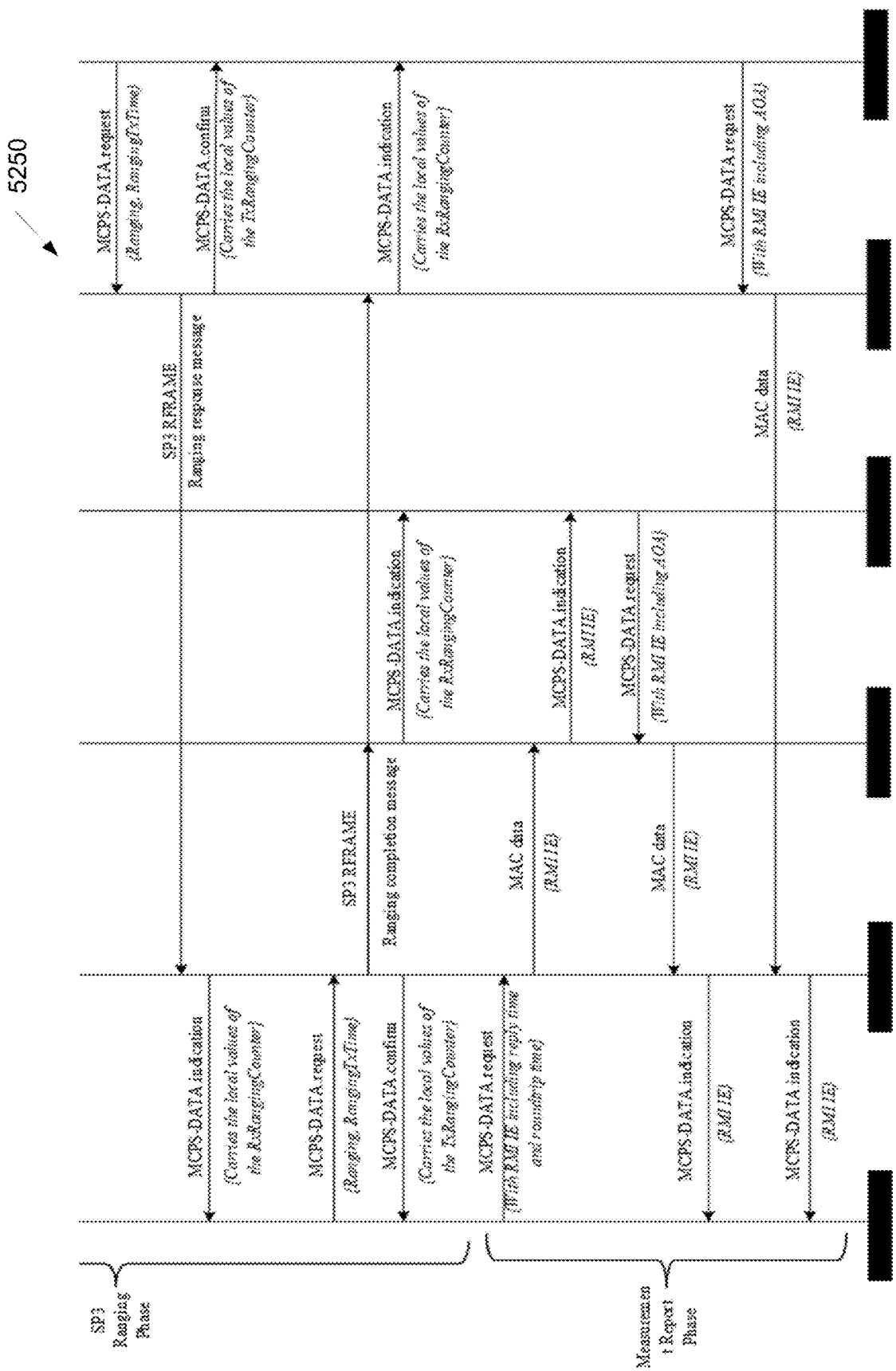
FIG. 52B illustrates an example message sequence chart for SP3 one-to-many DS-TWR according to embodiments of the present disclosure.

FIG. 52B illustrates an example message sequence chart 5250 for SP3 one-to-many DS-TWR according to embodiments of the present disclosure. The embodiment of the message sequence chart 5250 illustrated in FIG. 52B is for illustration only. FIG. 52B does not limit the scope of the present disclosure to any particular implementation.

In the development of IEEE specification, the ranging measurement information IE (RMI IE) can be used to exchange time measurement or AOA information after the ranging transmissions. This embodiment illustrates the ranging procedures for NHD SS-TWR and NHD DS-TWR by the message sequence charts (MSC). The present disclosure does not preclude the other semantics for NHD ranging and ranging-related IEs. For example, in the IEEE specification, the NHD ranging is renamed as SP3 ranging (STS PPDU format 3 as illustrated in FIG. 16 (e.g. (c)), while the NRRR IE introduced in the aforementioned embodiment 3 to exchange requests is renamed as SP3 ranging request reports IE (SRRR IE). FIGS. 51A and B, and FIGS. 52A and B illustrate examples of SS-TWR and DS-TWR MSCs for one-to-many ranging based on SP3 (or NHD) RFRAME.

For the ranging control phase and SP3 ranging phase, FIGS. 51A and B remain the same as that of FIGS. 49A and B. After the SP3 ranging phase, RDEVs are scheduled in the measurement report phase to send the requested information. For example, Initiator conveys the AOA and roundtrip time to the Responder-1 via the RMI IE. Responder-1 and Responder-N separately embed the requested reply time in the RMI IE to the Initiators.

FIGS. 52A and B illustrate an example of one-to-many DS-TWR with SP3 ranging, which is similar to FIGS. 51A and B. The main difference is that there is a second SP3 RFRAME in the ranging phase from the Initiator. The ranging control phase and SP3 ranging phase remain the same as that of FIGS. 50A and B.

At the beginning of the ranging round, the requests are broadcast from the Controller to Controlees. For example, an initiator requests the AOA report from both responder-1 and responder-N by setting the RAOA field of the SRRR IE to be one. After the SP3 ranging phase, RDEVs are scheduled to send their data reports with the requested information via the RMI IEs. For example, the initiator sends a reply time and round-trip time to responder-1, while responder-1 and responder-N send the AOA report back to the initiator, respectively. The controller assumes the role of a responder in this example. The controller may alternatively have been the Initiator.

FIG. 53 illustrates a flowchart of a method 5300 for secure ranging operation according to embodiments of the present disclosure, as may be performed by a transmit apparatus. The embodiment of the method 5300 illustrated in FIG. 53 is for illustration only. FIG. 53 does not limit the scope of the present disclosure to any particular implementation.

As illustrated in FIG. 53, the method 5300 begins at step 5302. In step 5302, a transmit apparatus determine at least one receive apparatus of a group of receive apparatuses participating in a ranging operation.

Subsequently, the transmit apparatus, in step 5304, identifies a scrambled timestamp sequence (STS) physical layer protocol data unit (PPDU) format 3 (SP3) ranging request reports information element (SRRR IE) for the at least one receive apparatus of the group of receive apparatuses.

In one embodiment, the SRRR IE comprises: a field for a requestor address present (RAP) indicating a presence of a requestor address field; a field for a provider address present (PAP) indicating a presence of a provider address field; a field to indicate whether a report of angle-of-arrival (RAOA) is required; a field to indicate whether a report pf reply time (RRT) is required; a field to indicate whether a report of round-trip-time (RRTT) is required; a filed to indicate whether a report of time-of-flight (RTOF) is required; a field for a reserved information indicating a reserved portion for a future usage; a field for the requestor address conveying an address of an apparatus requesting information that is indicated by the RAOA, the RRT, the RRTT, and the RTOF; and a field for the provider address indicating an address of an apparatus measuring the requested information that is indicated by the RAOA, RRT, RRTT, and RTOF.

In such embodiment, a length of the field for the provider address and the field for the requestor address are determined from a length of the SRRR IE; the reply time and the round-trip-time are calculated based on a time-stamp counted at a medium access layer (MAC); and a response of the reply time, from the at least one receive apparatus of the group of receive apparatuses, corresponding to a value 1 of the RRT in the SRRR IE, is embedded separately in ranging measurement information IE (RMI IE) received from the at least one receive apparatus of the group of receive apparatuses.

Finally, in step 5306, the transmit apparatus transmits, to the at least one receive apparatus of the group of receive apparatuses participating in the ranging operation, a ranging control message (RCM) including the SRRR IE using an in-band mechanism or an out-of-band mechanism. In step 5306, the RCM including the SRRR IE is transmitted in a time-scheduled ranging operation.

In one embodiment, the transmit apparatus configures the time-scheduled ranging operation in static or dynamic scheme via an IE.

In one embodiment, the transmit apparatus identifies a multi-node SP3 ranging including the transmit apparatus and at least two receive apparatuses of the group of receive apparatuses and transmits the RCM comprising the SRRR IE that does not include the field for the requestor address.

In one embodiment, the transmit apparatus transmits, to the at least one receive apparatus of the group of receive apparatuses, the RCM including two or more SRRR IEs to distinguish different pairs of apparatuses of the group of receive apparatuses.

In one embodiment, for a single-sided two-way ranging (SS-TWR) with a multi-node SP3 ranging, the transmit apparatus transmit, to the at least one receive apparatus of the group of receive apparatuses at a beginning of a ranging round (RR), the RCM including ranging configuration information and SRRR IEs to exchange a request of information for one or more ranging pairs; the multi-node SP3 ranging is scheduled via an in-band or an out-of-band mechanism; and each time slot for the multi-node SP3 ranging is allocated to a ranging device (RDEV).

In one embodiment, the transmit apparatus, for a double-sided two-way ranging (DS-TWR) with SP3 packets, transmits, to the at least one receive apparatus of the group of receive apparatuses at a beginning of an RR in a broadcasting manner, the RCM including ranging configuration information and SRRR IEs to exchange requests of information for one or more ranging pairs; and receives, from the at least one receive apparatus of the group of receive apparatuses, responses with RMI IEs, corresponding to the ranging configuration information and request IEs.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope

What is claimed is:

1. A controller device in a wireless communication system, the controller device comprising:
    a processor configured to:
        determine at least one controlee device of a group of receive controlee devices participating in a ranging operation; and
        identify a ranging request reports information element (RRR IE) for the at least one controlee device, wherein the RRR IE comprises a field to indicate whether predetermined information is required; and
    a transceiver operably connected to the processor, the transceiver configured to transmit, to the at least one controlee device, a ranging control message (RCM) including the RRR IE.

2. The controller device of claim 1, wherein the processor is further configured to configure a time-scheduled ranging operation via an IE.

3. The controller device of claim 1, wherein the RRR IE comprises:
    a field for indicating a presence of a requestor address field;
    a field for indicating a presence of a provider address field;
    a field to indicate whether a report of angle-of-arrival is required;
    a field to indicate whether a report of reply time is required;
    a field to indicate whether a report of round-trip-time is required;
    a field to indicate whether a report of time-of-flight is required; and
    at least one of the requestor address field or the provider address field.

4. The controller device of claim 3, wherein:
    lengths of the provider address field and the requestor address field are determined from a length of the RRR IE; and
    the reply time and the round-trip-time are calculated based on a time-stamp counted at a medium access layer (MAC).

5. The controller device of claim 3, wherein in case that the controller device is a requestor device requesting the predetermined information, the transceiver is further configured to transmit the RCM comprising the RRR IE that does not include the requestor address field.

6. The controller device of claim 3, wherein:
    the transceiver is further configured to receive a measurement information element from the at least one controlee device, and
    corresponding to a value 1 of the field to indicate whether the report of angle-of-arrival is required in the RRR IE, the report of the angle-of-arrival is embedded in the measurement information element.

7. The controller device of claim 1, wherein the transceiver is further configured to transmit, to the at least one controlee device of the group of controlee devices, the RCM including two or more RRR IEs to distinguish different pairs of devices from among the controller device and the group of controlee devices.

8. The controller device of claim 1, wherein, for a single-sided two-way ranging (SS-TWR) with a multi-node SP3 ranging:
    the transceiver is further configured to transmit, to the at least one controlee device of the group of controlee devices at a beginning of a ranging round, the RCM including ranging configuration information and the RRR IE to exchange a request of information for one or more ranging pairs;
    the multi-node SP3 ranging is scheduled via an in-band or an out-of-band mechanism; and
    each time slot for the multi-node SP3 ranging is allocated to a device participating in the ranging operation.

9. The controller device of claim 1, wherein, for a double-sided two-way ranging (DS-TWR) with SP3 packets:
    the transceiver is further configured to:
        transmit, to the at least one controlee device of the group of controlee devices at a beginning of a ranging round in a broadcasting manner, the RCM including ranging configuration information and the RRR IE to exchange requests of information for one or more ranging pairs; and
        receive, from the at least one controlee device of the group of controlee devices, responses with RMI IEs, corresponding to the ranging configuration information and the RRR IE.

10. The controller device of claim 1, wherein the ranging operation is a scrambled timestamp sequence (STS) physical layer protocol data unit (PPDU) format 3 (SP3) ranging operation, where the PPDU has no header or no data (NHD).

11. A controlee device in a wireless communication system, the controlee device comprising:
    a transceiver configured to receive, from at least one controller device, a ranging control message (RCM) including a ranging request reports information element (RRR IE); and
    a processor operably connected to the transceiver, the processor configured to identify a field in the RRR IE to indicate whether predetermined information is required, wherein the determine at least one transmit apparatus controlee device is in a group of controlee devices participating in a ranging operation.

12. The controlee device of claim 11, wherein the processor is further configured to identify a time-scheduled ranging operation via an IE.

13. The controlee device of claim 11, wherein the RRR IE comprises:
    a field for indicating a presence of a requestor address field;
    a field for indicating a presence of a provider address field;
    a field to indicate whether a report of angle-of-arrival is required;

a field to indicate whether a report of reply time is required;

a field to indicate whether a report of round-trip-time is required;

a field to indicate whether a report of time-of-flight is required; and at least one of the requestor address field or the provider address field.

14. The controlee device of claim 13, wherein:

lengths of the provider address field and the requestor address field are determined from a length of the RRR IE; and the reply time and the round-trip-time are calculated based on a time-stamp counted at a medium access layer (MAC).

15. The controlee device of claim 13, wherein in case that the controller device is a requestor device requesting the predetermined information, the transceiver is further configured to receive the RCM comprising the RRR IE that does not include the requestor address field.

16. The controlee device of claim 13, wherein:

the transceiver is further configured to transmit a measurement information element to the controller device, and corresponding to a value 1 of the field to indicate whether the report of angle-of-arrival is required in the RRR IE, the report of the angle-of-arrival is embedded in the measurement information element.

17. The controlee device of claim 11, wherein the transceiver is further configured to receive, from the at least one controller device, the RCM including two or more RRR IEs to distinguish different pairs of devices from among the controller device and the group of controlee devices.

18. The controlee device of claim 11, wherein, for a single-sided two-way ranging (SS-TWR) with a multi-node SP3 ranging:

the transceiver is further configured to receive, from the controller device at a beginning of a ranging round, the RCM including ranging configuration information and the RRR IE to exchange a request of information for one or more ranging pairs;

the multi-node SP3 ranging is scheduled via an in-band or an out-of-band mechanism; and each time slot for the multi-node SP3 ranging is allocated to a device participating in the ranging operation.

19. The controlee device of claim 11, wherein, for a double-sided two-way ranging (DS-TWR) with SP3 packets:

the transceiver is further configured to:

receive, from the controller device at a beginning of a ranging round in a broadcasting manner, the RCM including ranging configuration information and the RRR IEs to exchange requests of information for one or more ranging pairs; and transmit, to the controller device, responses with RMI IEs, corresponding to the ranging configuration information and the RRR request IE.

20. The controlee device of claim 11, wherein the ranging operation is a scrambled timestamp sequence (STS) physical layer protocol data unit (PPDU) format 3 (SP3) ranging operation, where the PPDU has no header or no data (NHD).

* * * * *